(12) United States Patent
Shurte et al.

(10) Patent No.: US 12,526,896 B2
(45) Date of Patent: Jan. 13, 2026

(54) SMART WALL-PLATE SYSTEM

(71) Applicant: Leviton Manufacturing Co., Inc., Melville, NY (US)

(72) Inventors: James Shurte, New Orleans, LA (US); Aaron Ard, New Orleans, LA (US); Jesse Ide, New Orleans, LA (US); Ronald J. Gumina, New Orleans, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 514 days.

(21) Appl. No.: 17/615,229

(22) PCT Filed: Jun. 9, 2020

(86) PCT No.: PCT/US2020/036765
§ 371 (c)(1),
(2) Date: Nov. 30, 2021

(87) PCT Pub. No.: WO2020/251922
PCT Pub. Date: Dec. 17, 2020

(65) Prior Publication Data
US 2022/0232689 A1 Jul. 21, 2022

Related U.S. Application Data

(60) Provisional application No. 62/861,449, filed on Jun. 14, 2019.

(51) Int. Cl.
*H05B 47/115* (2020.01)
*H01H 9/02* (2006.01)
(Continued)

(52) U.S. Cl.
CPC ......... *H05B 47/115* (2020.01); *H01H 9/0271* (2013.01); *H02G 3/14* (2013.01);
(Continued)

(58) Field of Classification Search
CPC .... H05B 47/19; H05B 47/115; H05B 47/196; H05B 47/10; H05B 47/105; H05B 47/12;
(Continued)

(56) References Cited

U.S. PATENT DOCUMENTS 3,958,869 A 5/1976 Beck
4,514,789 A 4/1985 Jester
(Continued)

FOREIGN PATENT DOCUMENTS

CN 211088619 U 7/2020
DE 102011088653 A1 6/2013
(Continued)

OTHER PUBLICATIONS

Author Unknown., "The Anywhere Switch/Switch Kit" Leviton Mfg. Co., Inc. 2013, 2 pages.
(Continued)

*Primary Examiner* — Anthony R Jimenez
(74) *Attorney, Agent, or Firm* — KDW Firm PLLC

(57) ABSTRACT

A smart wall-plate system having customizable device controls to initiate automation functions, routines, actions, activities, or control to be performed by a variety of local or remote devices is disclosed. The smart wall-plate system may be connected directly or indirectly to any number and type of local and remote devices as well as various cloud service platforms and home service hubs or assistants. The local and remote devices can include, for example, lighting devices, smart devices, and Internet-of-Things (IoT) devices. The wall-plate system may receive an input from a user. The wall-plate system or another system in communication with the wall-plate system may determine an instruction corresponding to, or triggered by, the received input. The instruction may specify an automated activity to be performed. In response, the wall-plate system or another (Continued)

system may transmit one or more signals to perform the automated activity.

25 Claims, 10 Drawing Sheets

(51) Int. Cl.
  *H02G 3/14* (2006.01)
  *H05B 47/175* (2020.01)
  *H05B 47/19* (2020.01)

(52) U.S. Cl.
  CPC ............ *H05B 47/19* (2020.01); *H05B 47/196* (2024.01); *H05B 47/197* (2024.01)

(58) Field of Classification Search
  CPC .... H05B 47/1965; H05B 47/11; H05B 47/00; H05B 47/197; H05B 45/40; H05B 45/345; H01H 9/0271; H01H 9/00; H01H 9/02; H01H 3/00; H01H 3/14; H01H 47/00; H02G 3/14; H02G 3/18; H02G 3/12; H02G 3/081; H02G 3/086; H02G 3/083; H02G 3/10; H01R 31/065; H01R 24/78; H01R 25/006; H01R 2103/00; H01R 31/06; H01R 13/70; H01R 13/703; H01R 13/6675; H01R 13/73; H01R 13/665; H01R 33/90; H01R 33/945; H01R 33/96; H01R 2105/00; H01R 24/68; H01R 12/57; H01R 13/02; H01R 13/17; H01R 13/42; H01R 13/6691; H01R 13/7038; H01R 13/74; H01R 2107/00; H01R 24/76; H01R 43/20; H02J 13/00004; H02J 13/00024; H02J 13/00026; H02J 13/0005; H02J 13/00001; H02J 13/00007; H02J 2207/10; H02J 2310/14; H02J 7/00; H02J 7/0068; H02J 3/00; H02J 3/007; H02J 4/00; Y04S 20/222; Y04S 20/242; Y04S 40/126; Y04S 40/121
  USPC .......................................................... 200/293
  See application file for complete search history.

(56) References Cited

U.S. PATENT DOCUMENTS

| | | | |
|---|---|---|---|
| 4,654,745 A | 3/1987 | Corby | |
| 4,939,792 A | 7/1990 | Urbish et al. | |
| D310,814 S | 9/1990 | Rosenbaum et al. | |
| D310,815 S | 9/1990 | Watson et al. | |
| D312,611 S | 12/1990 | Watson et al. | |
| 5,079,559 A | 1/1992 | Umetsu et al. | |
| 5,130,893 A | 7/1992 | Straate et al. | |
| 5,206,657 A | 4/1993 | Downey | |
| 5,239,205 A | 8/1993 | Hoffman et al. | |
| 5,336,979 A | 8/1994 | Watson et al. | |
| 5,340,954 A | 8/1994 | Hoffman et al. | |
| 5,436,421 A | 7/1995 | Sadowski | |
| 5,485,058 A | 1/1996 | Watson et al. | |
| D369,143 S | 4/1996 | Sorenson | |
| 5,565,855 A | 10/1996 | Knibbe | |
| 5,570,085 A | 10/1996 | Bertsch | |
| 5,621,283 A | 4/1997 | Watson et al. | |
| 5,637,964 A | 6/1997 | Hakkarainen et al. | |
| 5,663,862 A | 9/1997 | Hopping-Mills | |
| 5,703,329 A | 12/1997 | Delone | |
| D389,461 S | 1/1998 | Mayo et al. | |
| D389,805 S | 1/1998 | Mayo et al. | |
| D391,924 S | 3/1998 | Mayo et al. | |
| 5,736,965 A | 4/1998 | Mosebrook et al. | |
| D395,037 S | 6/1998 | Mayo et al. | |
| 5,818,128 A | 10/1998 | Hoffman et al. | |
| 5,838,226 A | 11/1998 | Houggy et al. | |
| 5,842,032 A | 11/1998 | Bertsch | |
| 5,844,516 A | 12/1998 | Viljanen | |
| 5,845,054 A | 12/1998 | Fukunaga | |
| 5,938,757 A | 8/1999 | Bertsch | |
| D416,871 S | 11/1999 | Todd | |
| 5,982,103 A | 11/1999 | Mosebrook et al. | |
| 6,011,226 A | 1/2000 | Sadowski et al. | |
| 6,013,885 A | 1/2000 | Kowalczyk | |
| 6,169,377 B1 | 1/2001 | Bryde et al. | |
| 6,326,754 B1 | 12/2001 | Mullet et al. | |
| 6,397,288 B1 | 5/2002 | Rye et al. | |
| 6,423,900 B1 | 7/2002 | Soules | |
| 8,340,975 B1 | 12/2012 | Rosenberger | |
| 9,401,252 B2 | 7/2016 | Keirstead | |
| 9,589,461 B1 | 3/2017 | Byrne | |
| 9,818,559 B2 | 11/2017 | Tress | |
| 9,860,965 B2* | 1/2018 | Recker | H05B 47/105 |
| 9,911,372 B2* | 3/2018 | Dimberg | H05B 47/19 |
| 9,978,547 B1 | 5/2018 | Wisniewski et al. | |
| 10,076,014 B2* | 9/2018 | Kelly | H05B 47/115 |
| 10,314,148 B2* | 6/2019 | Karc | H05B 47/115 |
| 10,386,891 B2 | 8/2019 | Allen et al. | |
| 10,475,596 B2 | 11/2019 | Dimberg | |
| 10,733,988 B2* | 8/2020 | Cook | G10L 15/22 |
| 10,852,771 B2 | 12/2020 | Allen et al. | |
| 10,965,068 B1 | 3/2021 | King et al. | |
| 2003/0075351 A1 | 4/2003 | Chang | |
| 2004/0202343 A1 | 10/2004 | Rye et al. | |
| 2005/0043907 A1* | 2/2005 | Eckel | G01K 1/08 374/E1.008 |
| 2008/0001549 A1 | 1/2008 | Altonen et al. | |
| 2011/0129097 A1 | 6/2011 | Andrea | |
| 2012/0129372 A1 | 5/2012 | Le Page | |
| 2013/0257315 A1 | 10/2013 | Restrepo et al. | |
| 2014/0246218 A1 | 9/2014 | Shotey | |
| 2014/0262848 A1 | 9/2014 | Fathollahi et al. | |
| 2014/0353130 A1 | 12/2014 | Sekikawa | |
| 2015/0078555 A1 | 3/2015 | Zhang et al. | |
| 2015/0156598 A1 | 6/2015 | Sun et al. | |
| 2015/0215747 A1 | 7/2015 | Kemmerer, Jr. et al. | |
| 2015/0256355 A1 | 9/2015 | Pera et al. | |
| 2015/0341072 A1 | 11/2015 | Lai et al. | |
| 2016/0110154 A1 | 4/2016 | Qureshi et al. | |
| 2016/0111837 A1 | 4/2016 | Misener | |
| 2016/0133893 A1 | 5/2016 | Chong | |
| 2016/0219682 A1 | 7/2016 | Altonen et al. | |
| 2016/0353547 A1 | 12/2016 | Shivell et al. | |
| 2016/0363143 A1 | 12/2016 | Druce et al. | |
| 2017/0027043 A1 | 1/2017 | Greene et al. | |
| 2017/0188437 A1 | 6/2017 | Banta | |
| 2017/0208657 A1 | 7/2017 | Jensen | |
| 2017/0271921 A1 | 9/2017 | Lombardi et al. | |
| 2018/0054688 A1 | 2/2018 | Cartwright et al. | |
| 2018/0063249 A1 | 3/2018 | Nguyen | |
| 2018/0084627 A1 | 3/2018 | Recker et al. | |
| 2018/0124903 A1 | 5/2018 | Strods et al. | |
| 2018/0145844 A1 | 5/2018 | Pera et al. | |
| 2018/0168332 A1 | 6/2018 | Wagner et al. | |
| 2018/0211656 A1 | 7/2018 | Chong et al. | |
| 2018/0228006 A1 | 8/2018 | Baker et al. | |
| 2018/0302235 A1 | 10/2018 | Cregg et al. | |
| 2018/0375308 A1 | 12/2018 | Rohmer | |
| 2019/0027875 A1 | 1/2019 | Parks | |
| 2019/0124752 A1 | 4/2019 | Kelly | |
| 2019/0130707 A1 | 5/2019 | Gruber | |
| 2019/0228923 A1 | 7/2019 | Li | |
| 2020/0037422 A1 | 1/2020 | Shivell | |
| 2020/0170139 A1 | 5/2020 | Horning | |
| 2021/0028954 A1 | 1/2021 | Ard et al. | |

FOREIGN PATENT DOCUMENTS

| | | |
|---|---|---|
| WO | 2012093412 A1 | 7/2012 |
| WO | 2012094722 A1 | 7/2012 |
| WO | 2015184193 A1 | 3/2015 |

(56) References Cited

FOREIGN PATENT DOCUMENTS

| WO | 2018148315 A1 | 8/2018 |
|---|---|---|
| WO | 2019084391 A1 | 5/2019 |
| WO | 2021133467 A1 | 7/2021 |

OTHER PUBLICATIONS

Author Unknown., "Seco-Larm SD-7202GC-PEQ Enforcer LED Illuminated RTE Single-gang Wall Plate with Large Green Button, Large Illuminated Push Button with Caption "Push To Exit", Pushbutton Rated 10A at 125 to 250VAC" Seco-Larm®—retrieved May 7, 2019—URL: https://www.amazon.com/Seco-Larm-SD-7202GC-PEQ-Illuminated-Single-gang-Pushbutton/dp/B0051BUGCA/ref=sr_1_1?crid=3DJETQGDS3II8&keywords=seco-larm%2Bsd-7202gc-peq&qid=1653064565&sprefix=-larm%2BSD-7%2Caps%2C98&sr=8-1&th=1.

International Search Report and Written Opinion for the International Patent Application No. PCT/US21/71739, mailed Jan. 27, 2022, 16 pages.

International Search Report and Written Opinion for corresponding PCT Application PCT/US20/36765, dated Aug. 28, 2020.

"Ecobee_Switch+_ecobee Smart_Home_ Technology2-website ecobee", https://www.ecobee.com/switch-plus/, downloaded on May 23, 2018.

"Ecobee is building Alexa into its thermostats and light switches", https://techcrunch.com/2017/05/03/ecobee-is-building-alexa-into-its-thermostats-and-light-switches/, May 3, 2017.

International Search Report and Written Opinion for the International Patent Application No. PCT/US2018/059333, dated Jan. 18, 2019, 12 pages.

International Search Report and Written Opinion for International application No. PCT/US20/58642, mailed on Mar. 26, 2021, 13 pages.

Petchel, Megan., "iDevices® and Hubbell Incorporated Debut First Co-Developed Technology Products at the 2018 Consumer Electronics Show (CES)" iDevices Blog, Jan. 9, 2018.

U.S. Appl. No. 62/455,973 Specification, Claims, Abstract, Drawings with Filing Receipt, filed Feb. 7, 2017, 42 pages.

International Search Report and Written Opinion for the International Application No. PCT/US23/13599, mailed Jun. 16, 2023, 18 pages.

\* cited by examiner

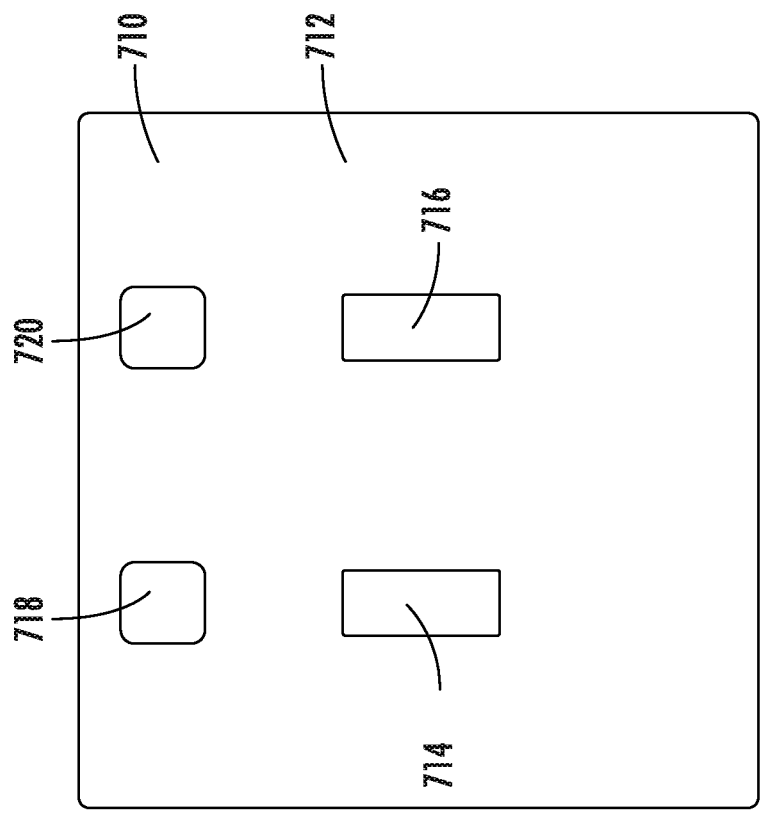
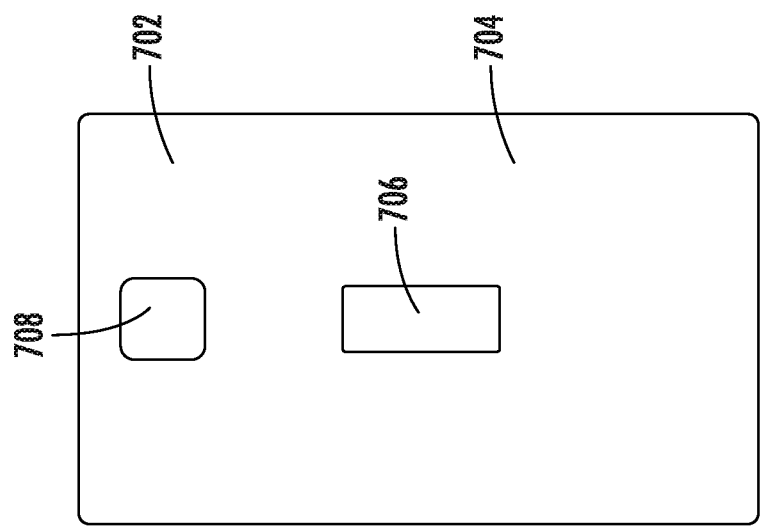

SMART WALL-PLATE SYSTEM

CROSS-REFERENCE TO RELATED APPLICATIONS

This application is a National Phase filing of International Application No. PCT/US2020/036765, filed Jun. 9, 2020, which application makes reference to and claims the benefit of the filing date of pending U.S. provisional patent application No. 62/861,449, filed Jun. 14, 2019, entitled "Smart Wall-Plate System," each application is incorporated by reference herein in its entirety.

FIELD OF THE DISCLOSURE

The present disclosure relates generally to a wall-plate, more particularly, to a smart wall-plate system having customizable device controls.

BACKGROUND OF THE DISCLOSURE

In-wall electrical devices such as, for example, an in-wall load control device generally include a toggle switch, a dimmer switch, etc. and can be used to control one or more loads such as, for example, a lighting load. Typically, each in-wall electrical device includes a conventional wall-plate. Conventional wall-plates are essentially decorative and provide no function other than to aesthetically cover any holes within a wall used to install the in-wall electrical device. As spaces begin to include more smart devices that can be controlled wirelessly, either directly or indirectly or through cloud services or using a local hub or controller, additional convenient control surfaces are needed throughout a space to provide interfaces for controlling the smart devices. While conventional wall-plates are often found throughout spaces in accessible locations, conventional wall-plate surfaces are very limited in functionality.

Thus, it would be desirable to provide a smart wall-plate system that includes smart device controls that can be customized by a user and that can be easily installed and configured by the user.

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is directed to a smart wall-plate system having customizable device controls to initiate automations including functions, routines, actions, activities, or controls (used interchangeably herein without the intent to limit) to be performed by a single device or a variety of local or remote devices. The smart wall-plate system may comprise a wall plate cover (often referred to as a wall plate), a mounting bracket, or a combination of a wall plate and a mounting bracket to couple with an electrical junction box or an in-wall device. The wall plate may cover an opening in a floor, wall, or ceiling of an electrical junction box of an in-wall device or even a blank plate to cover wiring access within a wall, ceiling, or floor. The in-wall device may be any type of device that may be installed in or about a junction box such as a lighting device, a lighting fixture, a breaker, a light switch, a power receptacle, a data outlet, an audio outlet, and/or the like.

The wall plate, mounting bracket, or combination of the wall plate and the mounting bracket may include circuitry on a printed circuit board (PCB). The circuitry may be integrated with a housing of the wall plate, the mounting bracket, or a combination of the wall plate and the mounting bracket, or may be applied to the housing of the same.

The smart wall-plate system may wirelessly connect directly or indirectly with any number and type of local and remote devices as well as various cloud service platforms and home service hubs or assistants. The local and remote devices can include, for example, lighting devices, smart devices, and Internet-of-Things (IoT) devices. The wall-plate system may receive an input from a user. The wall-plate system may transmit a signal to a remote device based on the received input to implement an instruction associated with the received input or may determine and implement an instruction corresponding to the received input. The instruction may specify an automated activity to be performed. The wall-plate system or the remote device may implement the instruction by transmission of one or more signals indicating the instruction to one or more devices, cloud service platforms, and/or home service hubs, thereby initiating or triggering performance of the automated activity.

BRIEF DESCRIPTION OF THE DRAWINGS

By way of example, specific embodiments of the disclosed device will now be described, with reference to the accompanying drawings, in which:

FIG. 7A illustrates a fourth embodiment of the smart wall-plate system depicted in FIG. 1;

FIG. 7B illustrates a fifth embodiment of the smart wall-plate system depicted in FIG. 1;

DETAILED DESCRIPTION

Figure 1:
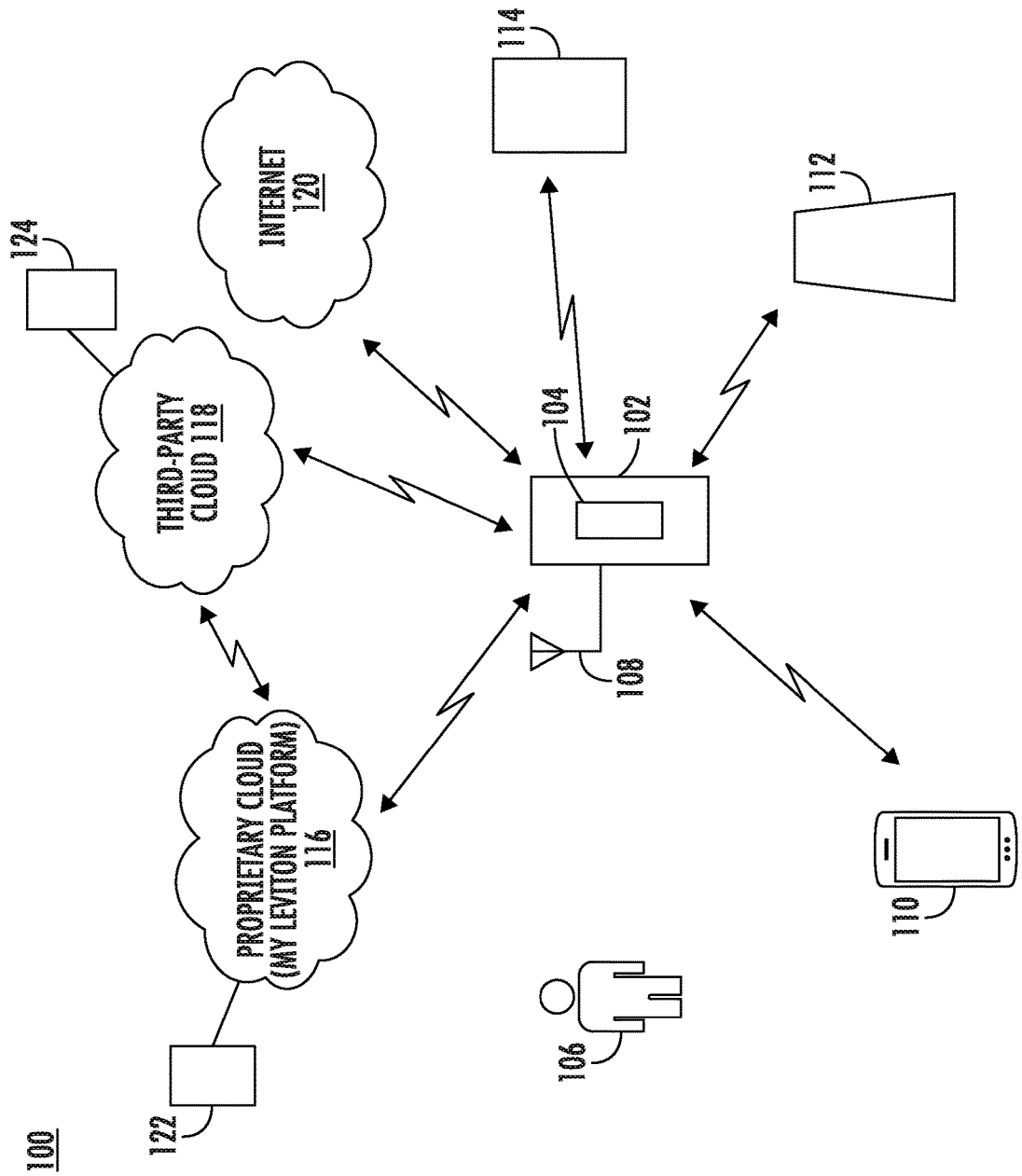
FIG. 1 illustrates an operating environment for a smart wall-plate system.

Devices, systems, and methods in accordance with the present disclosure will now be described more fully hereinafter with reference to the accompanying drawings, in which preferred embodiments of the devices, systems, and methods are shown. The disclosed devices, systems, and method, however, may be embodied in many different forms and should not be construed as being limited to the embodiments set forth herein. Rather, these embodiments are provided so that this disclosure will be thorough and complete, and will fully convey the scope of the devices, systems, and methods to those skilled in the art. In the drawings, like numbers refer to like elements throughout.

FIG. 1 illustrates an operating environment 100 for a smart wall-plate system 102. The smart wall-plate system 102 may provide customizable control of a variety of local and/or remote devices through a user interface provided on a surface positioned around an opening for an in-wall device 104. In some embodiments, the in-wall device 104 may be an electrical device such as, for example, a load control device such as, for example, a paddle switch, a toggle switch, a dimmer switch, a slide switch, a rocker switch, a push button, a capacitive touch switch, a touchscreen, etc. For example, the in-wall device 104 may be a light switch that may be coupled to any type of load such as, for example, a lighting load, a power receptacle, or a motor load such as a Fan.

In other embodiments, the in-wall device 104 may be a light fixture, a lighting device, an electrical receptacle or outlet, a blank, a sensor, a nightlight, an audio outlet, a data outlet, a phone line outlet, a breaker, etc. While in-wall devices, such as the in-wall device 104, may be described and illustrated in some embodiments herein as load control devices, embodiments are not so limited. The in-wall devices discussed herein can be any now known or hereafter developed in-wall device.

The operating environment 100 illustrates some of the types of devices, services, platforms, and/or networking components to which the wall-plate system 102 may connect, either directly or indirectly. A direct connection or link, for instance, may comprise a direct wireless link or channel between the smart wall-plate system 102 and another device such as a computing device 110 or a local device 112. The direct connection or link is possible when devices are within wireless communication range of one another. An indirect connection or link, for instance, may involve a wireless link via a relay device such as a wireless router, wireless switch, or wireless hub. An indirect connection or link, for example, may also involve communication with a controller to cause the controller to issue instructions to other devices wired to the controller or wirelessly connected to the controller.

The operating environment 100 may represent multiple networks such as ad hoc networks between local devices such as devices 102 110, 112, and 114 within wireless communication range, a local area network (LAN) with an access point to manage devices on the LAN and establish communications between devices within the wireless communication range of the access point, an Internet 120 to provide remote access between local networks and other networks coupled with the Internet 120, and one or more remote networks represented by the proprietary cloud 116 and remote device 122 as well as the third-party cloud 118 and remote device 124.

The wall-plate system 102 and portions of the operating environment 100 may reside within the same physical space such as, for example, a home, an office, a retail space, a warehouse, etc. The wall-plate system 102 enables a user 106 to control local and remote devices as well as local and remote third-party devices (collectively referred to herein as "devices" without intent to limit). The wall-plate system 102 may further provide the user 106 with access to proprietary (e.g., affiliated with the wall-plate system 102) and/or third-party service platforms 116 and 118, respectively, such as, for example, cloud service platforms as described further herein (collectively referred to herein as "cloud service platforms" without intent to limit). The wall-plate system 102 may control the devices with any type of automation function, routine, action, activity, or control such as, for example, implementing a predetermined lighting scene with lighting devices that are not powered off by an in-wall device such as the in-wall device 104. For instance, the in-wall device 104 may comprise a light switch coupled with one or more lighting devices. While the lighting devices remain powered through the in-wall device 104, the wall-plate system 102 may control brightness and/or color of one or more of the lighting devices as a group or individually.

The user 106 may also interact with the cloud service platforms to engage services provided by the cloud service platforms and/or to control remote devices to implement automation through the cloud service platforms. In various embodiments, a user input component of the user interface of the wall-plate system 102 may be associated or linked to a predetermined automation activity. When the user input component receives an input from the user 106, the wall-plate system 102 may cause transmission of one or more instructions to one or more devices to implement the automation activity, including an instruction to be handled by a cloud service platform. In some embodiments, for instance, the wall-plate system 102 may comprise a processor and memory to process an input from the user 106 to determine one or more instructions to transmit to one or more devices. In other embodiments, the wall-plate system 102 may transmit a signal in response to the input from the user 106 and a local or remote device may interpret the signal to determine one or more instructions to transmit to one or more devices. In such embodiments, the signal may comprise a packet including, e.g., an identifier for the wall-plate system 102 such as an address, an identifier for the local or remote device to which the signal is being transmitted such as an address. The addresses may be in any form such as a medium access control (MAC) address, a basic service set identifier (BSSID), a service set identifier (SSID), an assigned address, a compressed address, a truncated address, a hashed address, and/or the like. In further embodiments, the signal may include additional data such as audio data from the user 106, an instruction, a type of input, an address associated with an input, and/or the like.

As shown in FIG. 1, the wall-plate system 102 may comprise a wireless communications interface 108 (illustrated as the antenna coupled with the wall-plate system 102). The wireless communications interface 108 may comprise a baseband module coupled with one or more wireless transceivers, one or more radios, and one or more antennas, or antenna elements, to facilitate communication with wireless devices and/or cloud services platforms via one or more wireless communication protocols. In some embodiments, the wireless communications interface 108 may implement Bluetooth communications. In other embodiments, the wireless communications interface 108 may implement Wi-Fi communications. In still other embodiments, the wireless communications interface 108 may implement more than one type of wireless communications such as a Bluetooth communications and Wi-Fi communications.

To illustrate, some embodiments of the wall-plate system 102 may include a wireless communications interface 108 configured for Bluetooth communications and is designed to connect to one or more cloud service platforms via the Internet by pairing with a local device 112 that connects to the Internet via an area network such as a LAN. When the wall-plate system 102 is first powered on, the wall-plate system 102 may either actively seek a Bluetooth connection with the local device 112 or wait for a request from the local device 112. For instance, a user may have an application on a computer or smart phone to manage connections with the local device 112 and once the wall-plate system 102 is powered on and Bluetooth communications become available, the user request the local device 112 to detect new and available Bluetooth devices such as the wall-plate system 102. Once detected, the user may pair the local device 112 with the wall-plate system 102 by, e.g., entering a standard pairing code for the wall-plate-system 102 into the application for the local device 112. In other embodiments, the wall-plate system 102 may automatically pair with the local device 112 based on identification of the local device 112 as a recognized device. In still other embodiments, the user may use an application to communicate with the wall-plate system 102 and may pair the wall-plate system 102 with the local device 112 via a Bluetooth connection with the wall-plate system 102.

Once paired with the local device 112, the wall-plate system 102 may interact with the local device 112 and/or a cloud service platform via the local device 112 to set up functionality or automated routines with one or more user inputs built into the wall-plate system 102. In some embodiments, the user may provide commands to the local device 112 to assign functionality or automated routines to each of the one or more user inputs in the wall-plate system 102. For example, one user input on the wall-plate system 102 may comprise a capacitive switch and the user may assign a weather announcement to the capacitive switch. As a result, when the user activates the capacitive switch, the wall-plate system 102 may transmit an indication that the user selected the capacitive switch to the local device 112. The local device 112 may associate the user input of selection of the capacitive switch with annunciating the weather, communicate with a cloud services platform to obtain weather information or an audio weather announcement for a user-selected location or the local area of the location of the local device 112, and output an announcement of the weather either through a speaker within the local device 112 or a speaker communicatively coupled with the local device 112.

For both Bluetooth and Wi-Fi communications, the baseband module of the wireless communications interface of the wall-plate system 102 may generate or receive packets that include a packet header, a payload, and a data integrity check. The data check may be optional for some communications.

The baseband module of the wireless communications interface of the wall-plate system 102 may comprise a baseband processor or processing circuitry to perform medium access control (MAC) layer functionality and form MAC layer packets or frames that are referred to as MAC service data units (MSDUs) in some embodiments. The baseband module may pass the MSDUs to the physical layer (PHY) logic as MAC protocol data units (MPDUs) for inclusion in PHY packets or frames that are referred to as PHY protocol data units (PPDUs) in some embodiments. The wireless transceiver may comprise transmitter circuitry to form the PHY packets with one or more of the MPDUs and encode and modulate PHY packets for transmission. The wireless transceiver may also comprise receiver circuitry to demodulate and decode PHY packets received to provide the baseband module with MPDUs received in the PHY packets. The radio may comprise radio frequency circuitry to transmit packets and receive packets on a carrier frequency and the radio may couple with an array of antenna elements to transmit directional or omni-directional signals that include the PHY packets to one or more other devices.

For Bluetooth, the packet header may include fields such as a sequence number field, an acknowledgement number field, a data integrity check present field, a reliable field, a packet type field, a payload length field, and a header checksum field. The baseband module may calculate a sequence number for the packet and include that sequence number in the sequence number field. The baseband module may also calculate the next sequence number expected and include the next sequence number expected in the acknowledgement number field. The packet type may describe the type of the packet as, e.g., an acknowledgement packet, a command packet, a data packet, or other packet type. The payload length field may include a number of, e.g., octets of the payload data include in the packet. Furthermore, the packet header checksum may include a value to calculate to verify the validity of the packet header data received.

For Wi-Fi, the packet (or frame) header may include a frame control field with fields such as a protocol version field to indicate the protocol version associated with the MSDU, a type field and possibly a subtype field to indicate the format of the MSDU, and possibly other fields. The packet header may also include one or more addresses such as a BSSID, a source address and a destination address. The frame body may include a payload such as an instruction associated with the user input, an indication of a user input, and the like. For instance, if the wall-plate system 102 includes more than one user input such as two or more buttons or switches, the frame body may include an indication of receipt of input from one or more of the user inputs. To illustrate further, a combination of multiple inputs from the user may indicate a different automation routine or function than a single input from the user so the data to identify each of the user inputs may be included in the frame body of the MSDU.

The PHY packet typically includes a PHY preamble, a PHY header and a PHY body. In many embodiments, the PHY preamble provides a repetitive sequence of bits, referenced in some embodiments as short training sequences in a short training field, to inform the receiving device of the incoming communication. The PHY preamble may also include repetitive long training sequences in a long training field to train the antenna array of the receiving device to receive the incoming communication. In several embodiments, the PHY header includes a signal field to provide information about the incoming communication and the PHY body or payload may include one or more MPDUs.

In some embodiments, the wall-plate system 102 may transmit one or more PHY packets including one or more MSDUs to transmit information about a user input to a receiving device such as the computing device 110, the proprietary cloud 116, the third-party cloud 118, and/or any other device in the operating environment 100. For example, the user input to the wall-plate system 102 may involve a tap by the user on a button or touch of a capacitive touch switch to wake an audio record function in the wall-plate system 102. The user may then provide a command to the wall-plate system 102 in the form of a voice command such as "Lighting scene 1". The wall-plate system 102 may record the audio and form audio packets to, e.g., transmit to the third-party cloud 118 to translate the audio command.

In some embodiments, the wall-plate system 102 may form audio packets at the MAC layer as, e.g., one or more MSDUs. The MAC layer may pass the MSDUs to the PHY to transmit to the third-party cloud 118 to translate the audio command. In some embodiments, the third-party cloud 118 may translate the command and provide the command to the wall-plate system 102 for execution. In other embodiments, the third-party cloud 118 may provide the command to the proprietary cloud 116 for execution. In further embodiments, the third-party cloud 118 may provide the command to a local controller 112 for execution. In still other embodiments, the third-party cloud 118 determine the command and execute the command via transmission of one or more instructions to one or more devices associated with the wall-plate system 102.

In further embodiments, the wall-plate system 102 may receive a user input such as a touch of a capacitive touch switch and transmit one or more instructions based on the user input. For instance, the wall-plate system 102 may associate an identifier for the wall-plate system 102 or an identifier for the specific capacitive touch switch that the user touched. In response to the user input, the wall-plate system 102 may transmit a packet directly to a single other device, broadcast the packet to a group of devices, or broadcast the packet to all devices in the operating environment 100. For example, if the wall-plate system 102 has a single capacitive touch switch, the wall-plate system 102 may transmit a null data packet (NDP) to a local controller 112. The local controller 112 may be another device in the operating environment such as another wall-plate system, the computing system, or any other device such as a remote device, the proprietary cloud 116, or a third-party cloud 118. In several embodiments, the wall-plate system 102 may transmit a packet to another device through a network such as a personal area network, a local area network, a wide area network, a cellular network, the Internet, and/or the like. In many embodiments, the wall-plate system 102 may associate with one of the networks through a local device such as an Internet router or a wireless switch coupled with a local area network.

The wall-plate system 102 may transmit the NDP in the form of a MAC packet or a PHY packet. For instance, the NDP may include a MSDU with no frame body (no payload) or a PHY protocol data unit (PPDU) in the form of a PHY header with no payload. The MAC NDP may identify the wall-plate system 102 with, e.g., a source address. The PHY NDP may identify the wall-plate system 102 as data coded into the PHY header such as one or more training sequences that differ from typical training sequences via one or more phase shifts of the training sequences.

Some embodiments implement one or more Institute of Electrical and Electronics Engineers (IEEE) 802.11 standards (sometimes collectively referred to as "Wi-Fi"). Such standards may include, for instance, the IEEE 802.11-2016, published Mar. 29, 2012, and the IEEE 802.11ax/D1.4, published August 2017. Some embodiments implement the IEEE standards in accordance with a Wi-Fi Alliance specification such as the Wi-Fi Peer-to-Peer (P2P) technical specification version 1.7 published in 2017. Some embodiments implement other wireless communication protocols such as Bluetooth or Bluetooth Low Energy in accordance with, e.g., the Bluetooth Core Specification v5.0 published Dec. 6, 2016, Bluetooth Mesh, Near Field Communication, Zigbee, Z-wave, one or more cellular communication standards such as one or more 3rd Generation Partnership Project (3GPP), 3GPP Long Term Evolution (LTE), 3GPP LTE-Advanced (LTE-A), 4G LTE, and/or 5G New Radio (NR), technologies and/or standards, one or more infrared communication protocols, etc. Some embodiments implement a combination of one or more protocols of one or more of the standards and/or specifications. The embodiments are not limited to these standards.

The wall-plate system 102 may communicate wirelessly over any frequency within any licensed or unlicensed frequency band (e.g., over a 2.4 GHz operating frequency band or a 5 GHz operating frequency band). The wall-plate system 102 may implement any known security or encryption protocol or standard such as, for example, WEP, WPA or WPA2. The in-wall device 104 may also communicate, either directly or indirectly, with other devices including, for example, those depicted in FIG. 1 (e.g., over a wired or wireless connection) and/or may communicate with other devices depicted in FIG. 1 through one or more intermediate devices (such as, for example, a cellular base station, a Wi-Fi router, a cloud service platform, etc.).

As further shown in FIG. 1, the operating environment 100 may include a local computing device 110, a first local device 112, and a second local device 114. The local computing device 110 may be any type of computing device now known or hereafter developed including, for example, a desktop, a smartphone, a tablet, a notebook, a laptop, a netbook, or other computing device capable of communicating wirelessly with one or more wireless communication networks. The first and second local devices 112, 114 may be any type of lighting device such as, for example, a smart bulb and/or a Wi-Fi enabled lighting device. Alternatively, the first and second local devices 112, 114 may be any type of non-lighting device such as any type of smart device, Wi-Fi-enabled device, Internet-of-Things (IoT) device, etc. including, for example, a smart thermostat, a smart sensor, a smart device, or any other type of smart appliance. In various embodiments, the first local device 112 may be a smart home control hub or voice service hub (collectively referred to herein as "home service hub" without intent to limit) that is linked to a home and/or remote cloud service platform such as, for example, an Amazon Alexa hub, a Google Home hub, etc. The computing device 110 and the first and second local devices 112, 114 may be physically located within the same area or environment as the wall-plate system 102—for example, within the same room, home, office, retail space, or warehouse.

The wall-plate system 102 may be communicatively coupled to a proprietary cloud service platform 116. The proprietary cloud service platform 116 may be any proprietary cloud service platform associated or affiliated with the wall-plate system 102 and/or the in-wall device 104 (e.g., load control device) such as, for example, a company's proprietary cloud service platform (herein referred to as the "My Leviton Platform"). The wall-plate system 102 may also be connected to one or more third-party cloud service platforms 118 including, for example, the Amazon cloud service platform or the Google cloud service platform. Other third-party cloud service platforms 118 may include security systems or services (e.g., ADT, etc.) or environmental control systems (e.g., NEST, Honeywell, etc.). The wall-plate system 102 may also be connected to the Internet 120 via, e.g., a wireless router and/or an Internet gateway.

The wall-plate system 102 may operate to transmit and receive data from each of the My Leviton platform 116, any third-party cloud service platform 118, and the Internet 120, or any device connected thereto. As shown in FIG. 1, in various embodiments, the My Leviton platform 116 may be connected to the cloud service platform 118 so that data may be transmitted between the My Leviton platform 116 and the third-party cloud service platform 118. For example, data (such as instructions or an indication of the user input received) may be transmitted from the wall-plate system 102 to the My Leviton platform 116 and then to the third-party cloud service platform 118 and/or from the wall-plate system 102 to the third-party cloud service platform 118 and then to the My Leviton platform 116 to control one or more local or remote devices and/or to engage any service provided by the My Leviton platform 116 or the third-party cloud service platform 118.

As further shown in FIG. 1, the My Leviton platform 116 may be coupled to a first remote device 122 and the third-party cloud service platform 118 may be coupled to a second remote device 124. The first and second remote devices 122, 124 may be any type of electronic device including any type of computing device. In various embodiments, the first and second remote device 122, 124 may be any type of lighting device. Alternatively, in various embodiments, the first and second remote devices 122, 124 may be any type of non-lighting device such as any type of smart device, Wi-Fi-enabled device, IoT device, etc. including, for example, a smart thermostat, a smart sensor, a smart device, or any other type of smart appliance. Further, in various embodiments, the first and second remote devices 122, 124 may be any type of server, computer storage device, or computer networking system associated with the My Leviton platform 116 or third-party cloud service platform 118, respectively. The first and second remote devices 122, 124 may be located in a location that is remote from or outside of the physical space occupied by the wall-plate system 102.

The wall-plate system 102 may communicate with and/or control the first remote device 122 through connectivity with the My Leviton platform 116 and/or through connectivity with any other device or component depicted in FIG. 1. Similarly, the wall-plate system 102 may communicate with and/or control the second remote device 122 through connectivity with the third-party cloud service platform 118 and/or through connectivity with any other device or component depicted in FIG. 1. The local device 114 may also be controlled by the wall-plate system 102 directly or indirectly by communicating through a wireless local area network (LAN), communicating through the local controller 112 operating as a home service hub, and/or communicating through the My Leviton platform 116 or third-party cloud services platform 118. In this manner, any automation function, routine, actions, activity, or control for any number and combination of local and/or remote devices may be initiated by the user 1026 engaging the user interface of the wall-plate system 102.

In various embodiments, the wall-plate system 102 may include a user interface having one or more user input components that may be engaged by the user 106. When the user 106 engages a specific user input component, the wall-plate system 102 may determine a predetermined automation activity associated with the user input component engaged by the user 106. The wall-plate system 102 may then generate an instruction for implementing the automation activity in some embodiments and may transmit an indication of the received user input to another device such as the local controller 112 to interpret and implement the automation activity in other embodiments. The wall-plate system 102, local controller 112, or cloud services platform may then transmit a signal indicating the instruction to one or more devices or components depicted in FIG. 1 to implement the automation activity. The wall-plate system 102, local controller 112, or cloud services platform may transmit the instruction directly or indirectly to any of the devices or components depicted in FIG. 1. Any type of automation activity may be implemented based on the user 106 engaging the wall-plate system 102 including any of the following example activities:

Implement a local lighting scene—for example, the wall-plate system 102, local controller 112, or cloud services platform may transmit an instruction to the local device 114 (which may be a lighting device) to turn ON, turn OFF, to adjust a dimming setting, etc. The same or related instructions may be issued to other local lighting devices that may also be controlled in order to participate in the same local lighting scene. The instructions may be issued directly, indirectly, or through a combination of directly and indirectly transmitted instructions, including through a cloud services platform.

Implement a remote lighting scene—for example, the wall-plate system 102, local controller 112, or cloud services platform may transmit an instruction to the remote device 122 (which may be a lighting device) to turn ON, turn OFF, to adjust a dimming setting, etc. The same or related instructions may be issued to other remote lighting devices that may also be controlled in order to participate in the same remote lighting scene. The instructions may be transmitted indirectly through the local controller 112 (which may be a home service hub) and/or though the My Leviton platform 116.

Initiate playback of music—for example, the wall-plate system 102, local controller 112, or cloud services platform may transmit an instruction to a local device 114 (which may be a home service hub) or the computing device 110 (which may be a smartphone) to play music (e.g., from a predetermined playlist).

Order food—for example, the wall-plate system 102, local controller 112, or cloud services platform may transmit an instruction to the to the local device 114 (which may be a home service hub) and/or the third-party cloud service platform 118 to place a predetermined order (e.g., a predetermined pizza order) from a predetermined restaurant or delivery service.

Remote start a car—for example, the wall-plate system 102, local controller 112, or cloud services platform may transmit an instruction to the to the local device 114 (which may be a home service hub) or another device to start up a car.

Implement a return home routine—for example, the wall-plate system 102, local controller 112, or cloud services platform may transmit an instruction to the local device 114 (which may be a home service hub) and/or one or more other devices to implement actions when the user 106 enters a home (e.g., turn ON lights, adjust a thermostat, etc.)

Implement a leave home routine—for example, the wall-plate system 102, local controller 112, or cloud services platform may transmit an instruction to the local device 114 (which may be a home service hub) and/or one or more other devices to implement actions when the user 106 leaves a home (e.g., turn OFF lights, adjust a thermostat, etc.)

Lock a door—for example, the wall-plate system 102, local controller 112, or cloud services platform may transmit an instruction to the local device 114 (which may be a home service hub) and/or one or more other devices to cause a door to be locked.

In general, upon engagement of a user input component, the wall-plate system 102, local controller 112, or cloud services platform may issue any number of instructions to any number of local or remote devices, either directly or indirectly, to implement any functionality or to engage any service of any device capable of receiving and processing the instruction.

In various embodiments, the wall-plate system 102, local controller 112, and/or cloud services platform may be configured by the computing device 110 or the local device 114 operating as a home service hub. As an example, the computing device 110 may be a mobile computing device such as, for example, a smartphone that provides an application (app) that may be used to assign a user input component of the wall-plate system 102 to a particular automated activity. As a further example, the local controller 112 or local device 114 may operate as a home service hub may be used to assign a user input component of the wall-plate system 102 to a particular automated activity.

In various embodiments, the wall-plate system 102 may include a user interface that may receive and process physical inputs and/or verbal inputs from the user 102 to initiate transmission of one or more instructions to implement an automated activity.

In various embodiments, the wall-plate system 102 may control any local or remote device (e.g., the local device 114) by transmitting an instruction directly or indirectly including, for example, over local networking communications (including, for example, but not limited to Wi-Fi, Bluetooth, ZigBee, Z-Wave control within a space (e.g., a home, a commercial space, a hotel, an office, etc.). In various embodiments, the wall-plate system 102 may control any local or remote device (e.g., the local device 114 operating as a Wi-Fi enabled lighting device) through the My Leviton platform 116, through the third-party cloud service platform 118, the Internet 120, etc., or any combination thereof. For example, an instruction to turn on the local device 114 (operating as a lighting device) may be issued to one or more of the My Leviton platform 116 or the third-party cloud service 118 (e.g., through the local controller 112 operating as a home service hub) which may, in turn, issue a command to control the local device 114 as desired. Accordingly, connectivity with any device depicted in FIG. 1 may be direct or indirect including through any cloud service platform.

In use, the user 106 may interact with the wall-plate system 102 through the user interface provided by the wall-plate system 102. The user interface of the wall-plate system 102 may include one or more user input components to facilitate interaction with the user 106. For example, the wall-plate system 102 may include one or more microphones for receiving voice commands from the user 106. The wall-plate system 102 may also include one or more actuators, such as, for example, a capacitive touch switch, a touch sensitive device, a touch screen (including capacitive touch switches) or one or more buttons or other physically manipulated inputs, for receiving commands from the user 106. The wall-plate system 102 may also include one or more sensors such as, for example, a motion sensor, a photocell, a proximity sensor, etc. The sensors, in some embodiments, can provide input in conjunction with the user input to determine the automated activity associated with the user input. The wall-plate system 102 may also include one or more lights such as, for example, an LED, a nightlight, etc.

In some embodiments, the user input may be input from a sensor rather than from a button or switch. For instance, the wall-plate system 102 may include a motion sensor or proximity sensor to detect movement by a person in hallway, a room, an entry way, or the like. The user may, for instance, associate the detection of motion or proximity with an automated function to light an area. In some embodiments, the intensity of the lighting upon detection by the sensor may vary based on the time of day. To illustrate, the wall-plate system 102 may comprise one or more sensors as user inputs and the user may program a motion sensor with turning on one or more lights in an area. In response to detection of motion near a wall-plate system 102 at the entrance of a hallway late at night, the wall-plate system 102 may transmit an indication to the local device 112 via, e.g., Bluetooth or Wi-Fi, that the motion sensor detected motion. In response, the local device 112 may, autonomously or via communication with a cloud services platform, turn on lighting at a low level of intensity throughout the entire hallway. On the other hand, if the time of day is early morning, the user may program the light levels to turn on at full intensity. In other embodiments, the light intensity may not vary with the time of day.

The wall-plate system 102 provides various advantages over conventional wall-plates. As described herein, the wall-plate system 102 provides customizable device controls on an existing lighting control surface such as, for example, a wall-plate placed around one or more light switches. The wall-plate system 102 utilizes previously unused real estate found on conventional wall-plates and/or mounting brackets for wall plates to add built-in controls that provide an additional smart home control surface or interface. Further, as described herein, in various embodiments, the wall-plate system 102 may include all of the electronics and/or components related to providing customizable device controls and related functionality. As a result, the wall-plate system 102 may easily replace any existing wall-plate and can be installed without any need to cut holes in the wall and without any need for a neutral or other complex wiring in some embodiments. The wall-plate system 102 may therefore be installed by any user without the need for an electrician in some embodiments. Once installed, the wall-plate system 102 provides the user with built-in smart controls in a convenient location within a space (e.g., a residential or home space, a commercial space, an office, a hotel, etc.), thereby creating a new and dynamic control surface for triggering automated activities and routines.

Figure 2:
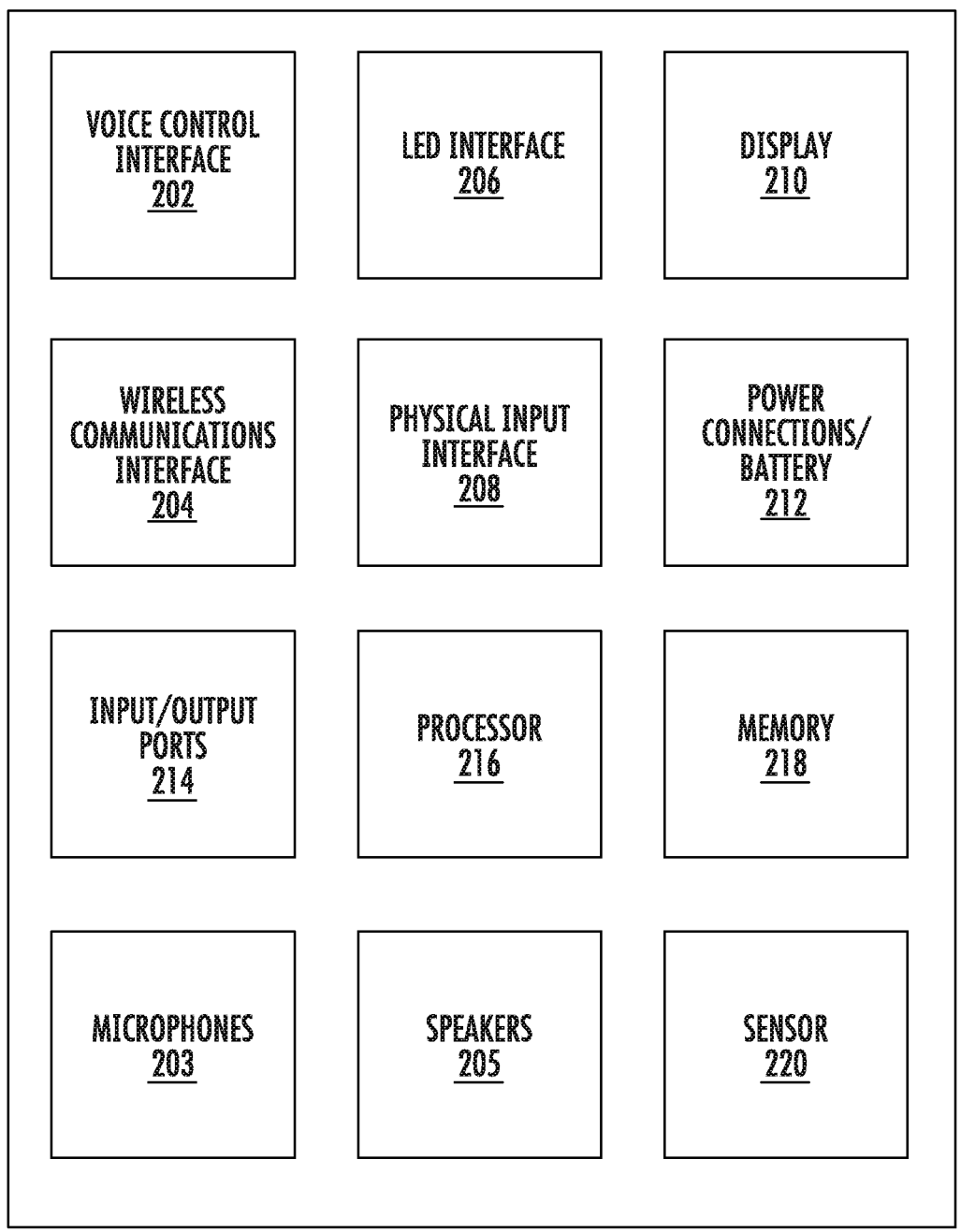
FIG. 2 illustrates a block diagram of functional components of the smart wall-plate system of FIG. 1.

FIG. 2 illustrates an embodiment of the wall-plate system 102. Specifically, FIG. 2 provides a block diagram of functional components of the wall-plate system 102. As shown, the wall-plate system 102 may include a voice control interface 202. The voice control interface 202 may receive and determine voice commands from the user 106. The voice control interface 202 may be used by the user 106 to control a device through the wall-plate system 102.

The voice control interface 202 may include one or more microphones 203. The microphones 203 may detect audible commands from the user 106. The voice control interface 202 may further include one or more speakers 205. The speakers 205 may output audio information to the user 106. The audio information may include synthesized voices from the voice control interface 202 and other audible information such as music or an alarm. For example, the wall-plate system 102 may receive an audio packet from a local device 112 or from a cloud services platform via the local device 112 and may output the audio from the audio packet via the one or more speaker 205.

The wall-plate system 102 may include a wireless communications interface 204 such as the wireless communications interface 108 in FIG. 1. The wireless communications interface 204 may include the wireless communication connection. The wireless communications interface 204 may provide interfaces for communicating with any local or remote device or network through any one or more wireless communications technology. The wireless communications interface 204 may include one or more transceivers and/or one or more antennas to facilitate communications over any wireless communication technology.

The wall-plate system 102 may include an interface such as, for example, a light emitting diode (LED) interface 206. The LED interface 206 may include one or more LEDs. The LED interface 206 may provide and adjust a visual display based on an operational state of the wall-plate system 102 (e.g., to indicate processing of a command, powering up, powering off, etc.). The LED interface 206 may provide a way for communicating information to the user 106 visually by adjusting the visual state of any LEDs coupled thereto. As an example, the LED interface 206 may provide a low power (e.g., low battery) indicator. As another example, one or more LEDs about a switch such as a capacitive switch may illuminate in response to activation of the switch by the user. In some embodiments, the LEDs may illuminate different colors to provide additional information or feedback to the user.

The wall-plate system 102 may include a physical input interface 208 for interfacing with one or more physical inputs that may be manipulated by the user 106. The physical input interface 208 may include or may be coupled to a variety of inputs including a keyboard, a push button, a slide, a capacitive touch switch or other touch-sensitive switch, and/or the like. The physical input interface 208 may provide a way for the user 106 to provide a command to the wall-plate system 102 to initiate an automated activity. The physical input interface 208 may include any type of input component that may be physically engaged by a user including components that are physically moved by the user 106 (e.g., a push button) or simply physically touched by the user 106 (e.g., capacitive touch switches).

The wall-plate system 102 may include a display 210. The display 210 may include a visual display that may render visual information and a display controller for controlling the rendering of any visual information. The visual information may be any graphical or textual information. The display 210 may include a touchscreen or a touch-sensitive display. Accordingly, the display 210 may provide visual information to the user 106 and/or may receive input from the user 106. In various embodiments, any capacitive touch switches of the physical input interface 208 may be provided through the display 210 or a pad or switch indication on a wall plate. The display 210 may be part of the LED interface 206 or may be separate therefrom. The physical input interface 208 and/or the display 210 may form a portion of the user interface component of the wall-plate system 102.

The wall-plate system 102 may include a power source 212. The power source 212 may include electrical power connections and/or a battery. The power source 212 may provide power to any of the constituent functional components of the wall-plate system 102 depicted in FIG. 2. In various embodiments, the power source 212 may be an electrical connection coupled to the in-wall device 104 (e.g., load control device).

The wall-plate system 102 may include one or more input/output ports 214. The input/output ports 214 may include any number and type of input and/or output ports including USB, HDMI, A/V, and/or a speaker/headphone jack. The input/output ports 214 provide alternative manners for communicating with the constituent functional components of the wall-plate system 102 depicted in FIG. 2 or provide alternative ways of providing outputs from any of the same.

The wall-plate system 102 may further include a processor circuit 216 and an associated memory component 218. The memory component 218 may store one or more programs for execution by the processor circuit 216 to implement one or more functions or features of the wall-plate system 102 as described herein. The processor circuit 21 may be implemented using any processor or logic device including a microcontroller. The memory component 218 may be implemented using any machine-readable or computer-readable media capable of storing data, including both volatile and non-volatile memory, and may reside internal or external to the wall-plate system 102.

The processor circuit 216 may implement the functionalities of any of the components depicted in FIG. 2 or may control or adjust operation of any of the depicted components. Each component depicted in FIG. 2 may be coupled to the processor circuit 216 as well as any other depicted component. The depicted components may be implemented in hardware or software as appropriate, or any combination thereof.

The wall-plate system 102 may further include one or more sensors 220 such as, for example, a motion sensor, a photocell, etc. In use, the sensors 220 may be used to trigger automation. For example, in one embodiment, upon detecting motion, the wall-plate system 102 may initiate one or more actions. In addition, and/or alternatively, in one embodiment, upon detecting a certain light level, the wall-plate system 102 may initiate one or more actions.

One or more of the components depicted in FIG. 2, also referred as circuitry, may be provided on a medium such as a printed circuit board (PCB) including, for example, the wireless communications interface 204, the processor circuit 216, and/or the memory component 218. The PCB may be implemented in any manner including as a rigid PCB, a flexible PCB, a thermo-formed PCB, in-mold electronics, etc.

The PCB may be integrated with a housing of a wall plate of the wall-plate system 102, with a housing of a mounting bracket of the wall-plate system 102, partially with a housing of the wall plate and partially with a housing of a mounting bracket for the wall plate of the wall-plate system 102, or may couple with the wall plate and/or the mounting bracket. In further embodiments, the PCB may be applied to or otherwise coupled with a housing of the wall plate or the mounting bracket, or may be applied partially to a housing of the wall plate and partially to a housing of a mounting bracket for the wall plate of the wall-plate system 102. For instance, in one embodiment, the PCB may snap into the back of the wall plate or, in other embodiments, the mounting bracket may hold the PCB in contact with the wall plate when mounted to a wall, floor, ceiling, electrical junction box, or the like.

Some embodiments may not comprise a mounting bracket or may comprise a mounting bracket that does not include any circuitry. In other embodiments, the PCB is integrated with a mounting bracket of the wall-plate system 102 and the wall plate of the wall-plate system 102 may not include any circuitry.

The wall plate of the wall-plate system 102 may be arranged and configured to operatively couple with an electrical junction box for an in-wall device or operatively couple with the in-wall device. In some embodiments, the wall plate of the wall-plate system may be arranged and configured to operatively couple with the electrical junction box for an in-wall device via a mounting bracket. In such embodiments, the mounting bracket may operatively couple with the electrical junction box for an in-wall device and the wall plate may couple with the mounting bracket.

In some embodiments, a mounting bracket may operatively couple with an electrical junction box or an in-wall device via one or more openings for screws to attach the mounting bracket with the electrical junction box or an in-wall device. In other embodiments, the mounting bracket may snap on to the electrical junction box or an in-wall device.

In some embodiments, the mounting bracket and the wall plate may comprise connection components to electrically interconnect or physically interconnect circuitry on the mounting bracket with circuitry on the wall plate to form the wall plate system 102. In some embodiments, the mounting bracket and/or the wall plate may include connectors to interconnect with wiring in the electrical junction box such as terminals, leads coupled with the PCB, electrically conductive pads, or any other type of connectors.

Figure 3:
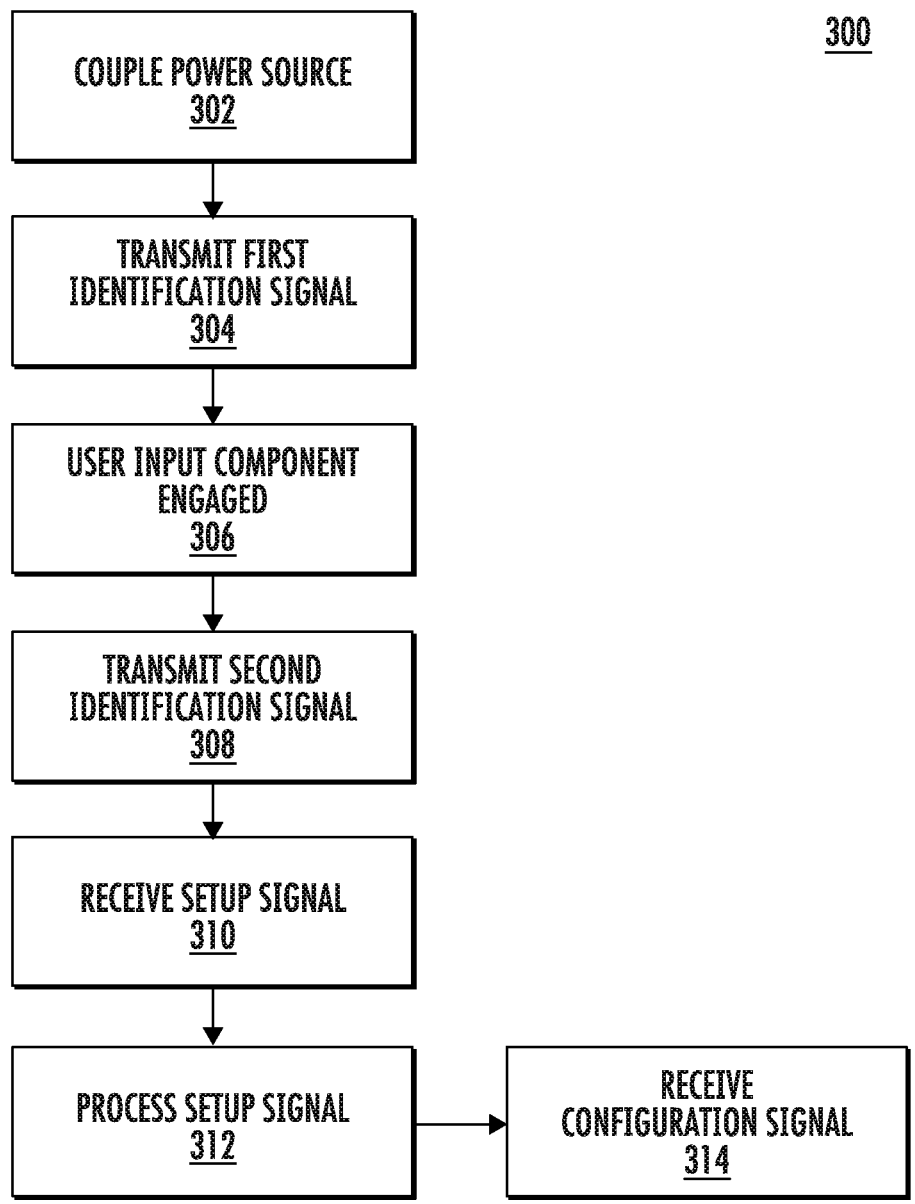
FIG. 3 illustrates a first logic flow associated with the smart wall-plate system of FIG. 1.

FIG. 3 illustrates a logic flow 300 associated with the smart wall-plate system 102. The logic flow 300 may begin with block 302. However, the logic flow 300 may begin with a different block other than the block 302. Furthermore, the logic flow 300 is not illustrated in a particular order. A different order other than that illustrated may be used. Some or all of the communications and operations associated with the logic flow 300 may be embodied as one or more computer executable instructions. Such computer executable instructions may be stored in a storage medium, such the memory component 218 depicted in FIG. 2. A computing device, such as the processor circuit 216 depicted in FIG. 2, may execute the stored computer executable instructions. The logic flow 300 may represent operations performed by the wall-plate system 102 when operating within the operating environment 100 in relation to any of the other devices or components depicted in FIG. 1.

In various embodiments, the logic flow 300 may represent a method of configuring the wall-plate system 102 through a provisioning platform. In various embodiments, the provisioning platform may be the computing device 110 (e.g., including an app running on the computing device 110), the local device 112 (e.g., operating as a home service hub providing connectivity to a cloud services platform), and or a cloud services platform (e.g., the My Leviton platform 116 and/or the third-party cloud services platform 118).

At 302, a power source may be coupled to the wall-plate system 102. In various embodiments, a line voltage may be coupled to the wall-plate system 102. The line voltage may be a line voltage coupled to the in-wall device 104 (e.g., load control device) and/or coupled to, for example, a load (e.g., a lighting load) controlled by the in-wall device 104. In various embodiments, the power source may be a battery. The battery may be any type of battery now known or hereafter developed including, for example, a cylindrical battery, a coin-cell, etc. The battery may be coupled to the wall-plate system 102 by the user 106 removing a tab or strip blocking electrical connectivity between the battery and the wall-plate system 102 such that when the tab is removed, the wall-plate system 102 (e.g., any component depicted in FIG. 2) may receive power from the battery. In some embodiments, the battery may comprise a rechargeable battery that may or may not be removable and/or swappable.

At 304, the wall-plate system 102 may transmit a first identification signal. The first identification signal may be transmitted wirelessly. The first identification signal may be a broadcast signal that may be received by any device within range to receive the first identification signal. The first identification signal may be transmitted automatically by the wall-plate system 102 in response to the wall-plate system 102 being coupled to the power source at 302. The first identification signal may include an identifier identifying the wall-plate system 102. The first identification signal may also indicate that the wall-plate system 102 is new to the operating environment 100, may indicate that the wall-plate system 102 is ready to be connected to another device or network, and/or may indicate that the wall-plate system 102 is ready to be configured for operation in accordance with the functionalities disclosed herein.

In some embodiments, the first identification signal may include a probe request or similar packet transmitted by the MAC layer of the wireless communications interface 108 to actively seek a compatible network within a wireless range of the wall-plate system 102. For example, a baseband module of the wall-plate system 102 may generate an MSDU in the form of a probe request frame. The probe request or similar packet may include capabilities information associated with the wireless communications interface 108 of the wall-plate system 102 such as modulation and coding rates, bandwidths, and/or the like. In some embodiments, the wall-plate system 102 may transmit a probe request or similar packet that includes a service set identifier (SSID) that can be an identifier for a specific network with which the wall-plate system 102 will associate or a wildcard value that identifies one or more networks or any network that can receive the first identification signal.

In other embodiments, the wall-plate system 102 may passively wait to receive a packet such as a beacon or other packet that identifies an SSID, a basic SSID (BSSID), or otherwise identifies a network within range of the wall-plate system 102.

The wall-plate system 102 may provide an indication that the first identification signal is being transmitted. For example, in various embodiments, the wall-plate system 102 may control illumination of one or more LEDs to indicate the wall-plate system 102 is transmitting the first identification signal. The first identification signal may be transmitted using any wireless communication technology.

At 306, the user 106 may operate a provisioning platform—for example, the computing device 110, the local device 112, the cloud services platform, etc. For purposes of explanation only, the logic flow 300 is described in relation to the user 106 using the computing device 110 to configure the wall-plate system 102 without intent to limit, it will be appreciated that the logic flow 300 could equally use the local device (or local controller) 112, local device 114, the cloud services platform, or any other now known or hereafter developed provisioning platform. The computing device 110 may execute an app to configure the wall-plate system 102. The app of the computing device 110 may request the user 106 to confirm which device transmitted the first identification signal. Accordingly, in response thereto, the user 106 may engage a user input component of a user interface of the wall-plate system 102 to verify the wall-plate system 102 is to be configured by the computing device 110. The user 106 may engage a physical user input component of the wall-plate system such as, for example, a physically movable button (e.g., a push button) or a capacitive touch switch, or a capacitive touch switch that may be provided through a touch screen of the wall-plate system 102.

At 308, the wall-plate system 102 may transmit a second identification signal. The second identification signal may be transmitted wirelessly. The second identification signal may be a broadcast signal that may be received by any device within range to receive the second identification signal. The second identification signal may be transmitted automatically by the wall-plate system 102 in response to the user 106 engaging the user input component of the wall-plate system at 306.

In various embodiments, the second identification signal may be the same signal as the first identification signal. In various embodiments, the second identification signal may indicate that the second identification signal is being transmitted in response to the user input received at 306, may indicate that it is the device that transmitted the first identification signal, and/or may otherwise indicate that the wall-plate system 102 is ready to be configured. The second identification signal may be transmitted using any wireless communication technology.

In some embodiments, the second identification signal may comprise an association request or other similar packet that requests association with a network identified as a response to the first identification signal. The association request or other similar packet may include an identifier of the specific network with which the wall-plate system 102 requests to associate as well as an identifier for the wall-plate system 102. In further embodiments, the second identification signal may involve negotiation of a security policy to establish authentication credentials for secure wireless links between the wall-plate system 102 and the computing device 110, proprietary cloud 116, third-party cloud 118, local devices 112 and 114, an access point for an area network such as a local area network (LAN), personal area network (PAN), peer-to-peer (P2P) network, and/or the like.

Note that negotiation of a security policy may involve generation of one or more keys such as group keys, pairwise keys, and/or the like, and may, in some embodiments, require knowledge of other keys such as a preshared key, username and password, certificate, one time password, token and/or the like. In some embodiments, MAC layer may add the preshared key, username and password, certificate, one time password, token and/or the like, in the frame body of the MSDU such as a management frame or the like.

At 310, the wall-plate system 102 may receive a setup signal from, for example, the computing device 110. Alternatively, as previously mentioned, the setup signal may come from any other provisioning platform such as the local device 112, the cloud services platform, etc. In one alternate embodiment, for example, the setup signal came from a voice command received at, for example, a third party hub, the third party hub may then transmit the setup signal to the wall-plate system 102. Thus arranged, the wall-plate system 102 can be fully configured using voice. In one embodiment, the wall-plate system 102 may be configured via a voice driven setup process without the need of an app or local smart phone. The setup signal may be received wirelessly by the wall-plate system 102. The setup signal may include an identification of the computing device 110—e.g., an identification of the provisioning platform that transmitted the setup signal and may include authentication credentials to access a network and to facilitate secure links between the wall-plate system and the computing device 110 and/or other devices on the network. The setup signal may include an identification of a wireless LAN such as an association response, beacon, or similar packet.

At 312, the wall-plate system 102 may process the received setup signal. The wall-plate system 102 may process the setup signal to establish a communication link to the computing device 110. In various embodiments, the communication link may be a direct communication link between the wall-plate system 102 and the computing device 110 such as a peer-to-peer (P2P) link, a personal area network link, or a Bluetooth link. In various embodiments, the wall-plate system 102 may process the received setup signal to communicatively couple the wall-plate system 102 to the LAN (e.g., join the LAN) such that the communication link involves communicating through the LAN. Processing the received setup signal may involve detection of the signal by a receiver of a wireless communications interface, decoding the signal field of a PHY header of a PPDU, demodulating and decoding the payload of the PPDU, including one or more MPDUs, and passing the MPDUs to the MAC layer in the baseband module for parsing and interpretation. Note that in some digital implementations of the PHY, one or more of the encoding/decoding and modulation/demodulation functions can be implemented in code executed in processor circuitry of the baseband module. Alternatively, for example, the wall-plate system 102 may process the received setup signal to communicatively couple the wall-plate system 102 whether that be, for example, Wi-Fi or a cloud services platform.

At 314, the wall-plate system 102 may receive a configuration signal from the computing device 102. The configuration signal may indicate a user instruction to assign to a user input component of the user interface of the wall-plate system 102. The wall-plate system 102 may process the received configuration signal such that when the specified user input component of the wall-plate system 102 is engaged by the user 106, the wall-plate system 102 is aware of what automation settings are desired by the user 102. Accordingly, the wall-plate system 102 may transmit one or more instruction signals to one or more devices within the operating environment 100 to implement the automation settings specified by the user 102.

In alternative embodiments, the setup signal may indicate identifiers for each of the user input components in the wall-plate system 102 or confirm receipt of identifiers for each of the user input components. The identifiers may comprise addresses or other identifiers for each of the input components to facilitate distinct identification of each of the user input components. For example, the identifiers may include one or more bits added or included with the address of the wall-plate system 102. In other words, the combination of the address or identifier for the wall-plate system and a two-bit identifier for user input components may facilitate unique identifiers for each of four different user input components in the wall-plate system 102.

The distinct identifications for each of the user input components may provide a second device such as a local controller, a proprietary cloud 116, a third party cloud 118, and/or the like, with a capability to associate functionality, or automated activity, with each of the user input components individually and/or in combination. The local controller may comprise another wall-plate system, a computing device, or any other device in the operating environment 100 and that has the capability to associate functionality with the user input components of the wall-plate system 102.

In other embodiments, each user input component may have a unique identification known to the wall-plate system 102 and the wall-plate system 102 may communicate the unique identifiers for each of the user input components of the wall-plate system 102 to a second device such as a local controller, a proprietary cloud 116, a third party cloud 118, and/or the like to associate functionality with each of the user input components.

For embodiments in which a second device associates identifiers of each of the user input components with functionality, the wall-plate system 102 may respond to user input by transmitting the identifier for the user input component to the second device. The second device may, in response to receipt of a communication from the wall-plate system 102, associate functionality such as instructions with the user input via the user input component and execute the functionality (automated activity) by, e.g., changing the brightness and/or color of lighting devices in a particular area about the wall-plate system 102 or in another area within the control of the wall-plate system 102.

Figure 4:
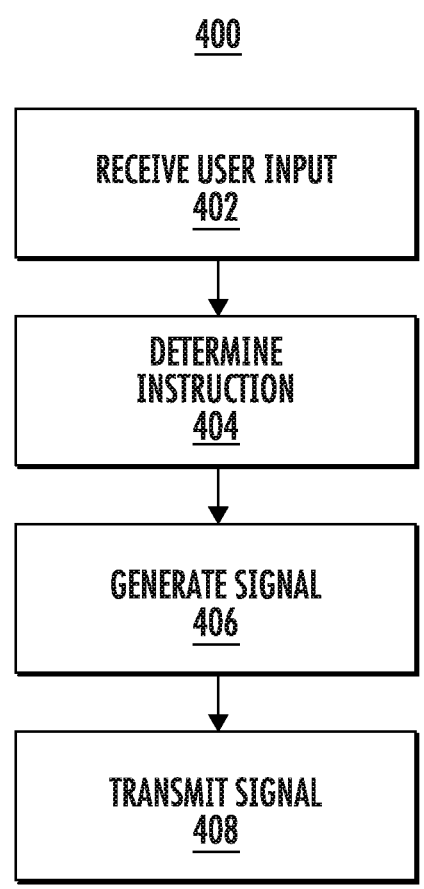
FIG. 4 illustrates a second logic flow associated with the smart wall-plate system of FIG. 1.

FIG. 4 illustrates a logic flow 400 associated with the smart wall-plate system 102. The logic flow 400 may begin with block 402. However, the logic flow 400 may begin with a different block other than the block 402. Furthermore, the logic flow 400 is not illustrated in a particular order. A different order other than that illustrated may be used. Some or all of the communications and operations associated with the logic flow 400 may be embodied as one or more computer executable instructions. Such computer executable instructions may be stored in a storage medium, such the memory component 218 depicted in FIG. 4. A computing device, such as the processor circuit 216 depicted in FIG. 4, may execute the stored computer executable instructions. The logic flow 400 may represent operations performed by the wall-plate system 102 when operating within the operating environment 100 in relation to any of the other devices or components depicted in FIG. 1.

At 402, the wall-plate system 102 may receive an input from the user 106. The input may be received through a user interface of the wall-plate system 102. The input may be an audible input (e.g., a voice command) or may be a physical input (e.g., the user may engage a push button or capacitive touch switch).

At 404, the wall-plate system 102 may determine an instruction corresponding to the received input. In some embodiments, the instruction may involve transmission of an identifier for the received input to a second device such as a local device, local controller, a proprietary cloud, and/or a third party cloud at element 406. In other embodiments, the wall-plate system 102 may associate the instruction corresponding to the received input with an automation function, routine, action, activity, or control desired by the user 106. In such embodiments, the wall-plate system 102 may determine the instruction (or set of instructions) corresponding to implementing the desired automation activity.

At 406, the wall-plate system 102 may generate a signal that, in some embodiments, indicates the received input via a user input component so that a second device can associate the received input with functionality or, in other embodiments, indicates the determined instruction or set of instructions. The signal may be a broadcast signal, or a signal directed to one or more devices of the operating environment 100. Furthermore, the signal may comprise one or more MPDUs in a PPDU, a NDP MPDU in a PPDU, or a NDP PPDU that indicates, for example, an identifier for the wall-plate system 102 and an identifier for the user input component(s) activated by the user 106. In some embodiments, the wall-plate system 102 may also accept a combination of more than one received inputs via the same user input component, one or more sensors, and/or different user input components within a predefined period of time or as long as the inputs are not separated by more than a specified delay time period. For example, the wall-plate system 102 may accept as a single user input, a combination of multiples actuations of one or more user input components as long as the delay between actuations are no longer than, e.g., 10 milliseconds apart, 100 milliseconds apart, 1 second apart, or the like and such a delay may be customizable by setting a preference, slide switch, dip switch, and/or the like. In such embodiments, the actionable combinations of one or more user inputs and/or sensors may also be associated with unique identifiers.

To illustrate further, a first user input component of the wall-plate system 102 may function as a dimmer switch. The first user input component may comprise a capacitive touch switch. The longer that a user 106 touches the first user input component, the more activations that the wall-plate system 102 identifies with the received input. Thereafter, either the wall-plate system 102 or a second system may interpret the number of actuations of the first input component as increases or decreases in the level of brightness of one or more lighting devices associated with the wall-plate system 102.

At 408, the wall-plate system 102 may transmit the generated signal. The signal may be transmitted wirelessly using any wireless communication technology. In some embodiments, the signal may indicate the receive input to a second device so the second device may identify functionality associated with the received input and transmit corresponding instructions to one or more devices in the operating environment 100. In other embodiments, the wall-plate system 102 may transmit the signal to a device for execution of the determined instruction to implement the desired automation activity. In various embodiments, the signal may be transmitted to one or more devices. In various embodiments, one or more signals containing one or more instructions (e.g., a first signal indicating a first instruction, a second signal indicating a second instruction, etc.) may be transmitted to different devices by the second device in some embodiments or by the wall-plate system 102 in other embodiments.

The one or more signals transmitted by the wall-plate system 102 may be transmitted to any device or component depicted in FIG. 1 including, for example, a local device, a remote device, a cloud services platform, a lighting device, a non-lighting device, an IoT device, a smart device, and/or a home service hub. The one or more signals transmitted by the wall-plate system 102 may be transmitted directly to an intended device or indirectly (e.g., through a wireless network, a home services hub, a cloud services platform, etc.).

In various embodiments, the wall-plate system 102 may include a mounting bracket and a wall-plate cover (or wall-plate for simplicity). In other embodiments, the wall-plate system 102 may only include a wall plate. The wall-plate may be positioned around the in-wall device 104 and may have an opening to accommodate, for example, a protruding switch of a load control device, a power receptacle, a cable outlet, a phone line outlet, a data outlet, and audio outlet, a universal serial bus (USB) charger, and/or the like. The wall-plate system 102 may be sized and configured with a single opening for surrounding a single in-wall device 104, a multiple opening for surrounding two or more in-wall devices 104, or any number of ganged devices such as: single gang, dual gang, three-gang, four-gang, five-gang, etc. For example, the wall-plate system 102 may be sized and configured for a four-gang switch bank of four (4) light switches. In use, the wall plate may be any wall plate as conventionally known or hereafter developed and the wall-plate system 102 may fit around any standard opening size such as, for example, as set by NEMA (the National Electrical Manufacturers Association) and may include a Decora-style opening, a toggle-style opening, etc. As such, and as will be appreciated by one of ordinary skill in the art, the present disclosure should not be limited to any particular type of wall-plate unless specifically claimed.

In various embodiments, the mounting bracket may be placed into position using a variety of mechanisms including, for example, mounting screws. In various embodiments, the wall plate may snap onto the mounting bracket or an in-wall device 104, or otherwise attached with the mounting bracket or an in-wall device 104 with or without the use of screws. In various embodiments, the wall plate may be screwed into the mounting bracket or an in-wall device 104. In various embodiments, the wall-plate system 102 may include a cover that may be attached to a wall using a variety of mechanisms including, for example, an adhesive.

The surface of the wall-plate (e.g., an outer exposed portion of the wall-plate system 102) may provide a dynamic control surface for triggering activities to be performed by any type of device such as, for example, a smart device, an IoT device, a lighting device, etc., as described herein. The surface of the wall-plate may provide the user interface for the wall-plate system 102. The components of the wall-plate system 102 may be distributed in any manner between the mounting bracket and the wall-plate of the wall-plate system 102.

Figure 5:
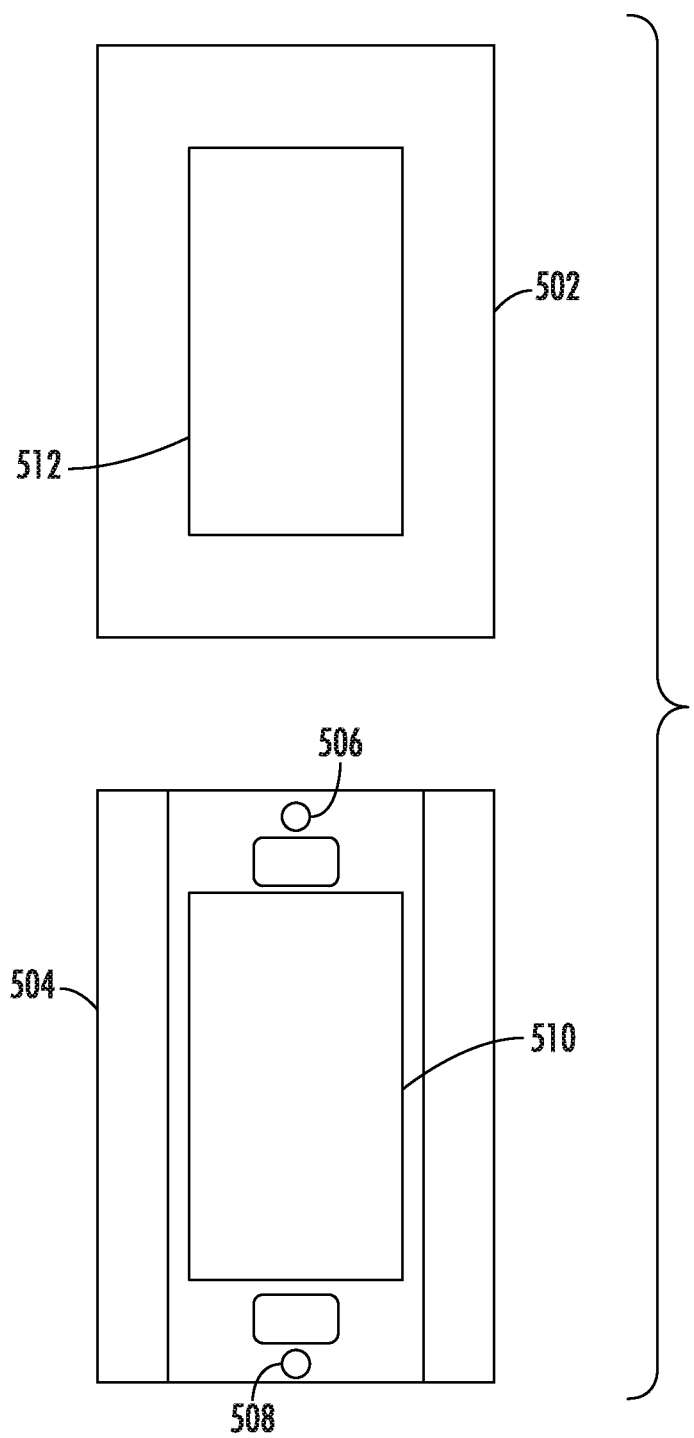
FIG. 5 illustrates a first embodiment of the smart wall-plate system depicted in FIG. 1.

FIG. 5 illustrates an embodiment of the wall-plate system 102. As shown, the wall-plate system 102 may include a wall-plate 502 and a mounting bracket 504. The mounting bracket 504 may include a first opening 506 to accommodate a first mounting screw and a second opening 508 to accommodate a second mounting screw, enabling the mounting bracket to be attached to a wall or an electrical junction box. The mounting bracket 504 may include an opening 510 to accommodate or provide access to an in-wall device 104 such as, for example, a load control device, a power receptacle, a cable outlet, a phone line outlet, a data outlet, and audio outlet, a universal serial bus (USB) charger, and/or the like. In various embodiments, the mounting bracket 504 may be screwed into a strap of the in-wall device 104 (e.g., into the strap of a switch or dimmer). As will be appreciated by one of ordinary skill in the art, the smart wall-plate system 102 may be arranged and configured to receive a user interface. In use, the user interface may be any now known or hereafter developed user interface such as, for example, a dimmer switch, a toggle switch, a paddle switch, a push-button, a capacitive touch switch, a touchscreen, etc. As such, the opening formed in the smart wall-plate system 102 may be appropriate sized and configured.

The wall plate 502 may be attached to the mounting bracket 504 in a variety of manners. In an embodiment, the wall-plate 502 may snap onto the mounting bracket 504. The wall-plate 502 may also include an opening 512 to accommodate or provide access to the in-wall device 104 such that the wall plate 502 fits around the in-wall device 104. The wall plate 502 may be provided in a variety of shapes, sizes, and form factors and may accommodate any type of in-wall device (e.g., any type of load control device like a switch or dimmer control including one or more switch or dimmer controls, any type of outlet or receptacle, and/or a combination thereof). In other embodiments, the wall plate may comprise a blank plate (no opening for an in-wall device 104) to cover a junction box and/or other wall opening. The wall-plate 502 may also be provided in a variety of color and/or finish options.

In various embodiments, the components of the wall-plate system 102 depicted in FIG. 2 may be distributed between the wall-plate 502 and the mounting bracket 504 in any manner. In various embodiments, all of the components of the wall-plate system 102 depicted in FIG. 2 may be provided on the wall plate 502. In various embodiments, the surface of the wall plate 502 may include one or more user input components including, for example, one or more physical buttons and/or one or more areas for capacitive touch switches, proximity sensors, and/or the like. In various embodiments, the wall-plate system 102 may include a power regulator and/or may include an electrical connection between the wall plate 502 and the mounting bracket 504. In various embodiments, the wall-plate system 102 may not include a power regulator and/or may not include an electrical connection between the wall plate 502 and the mounting bracket 504.

Figure 6B:
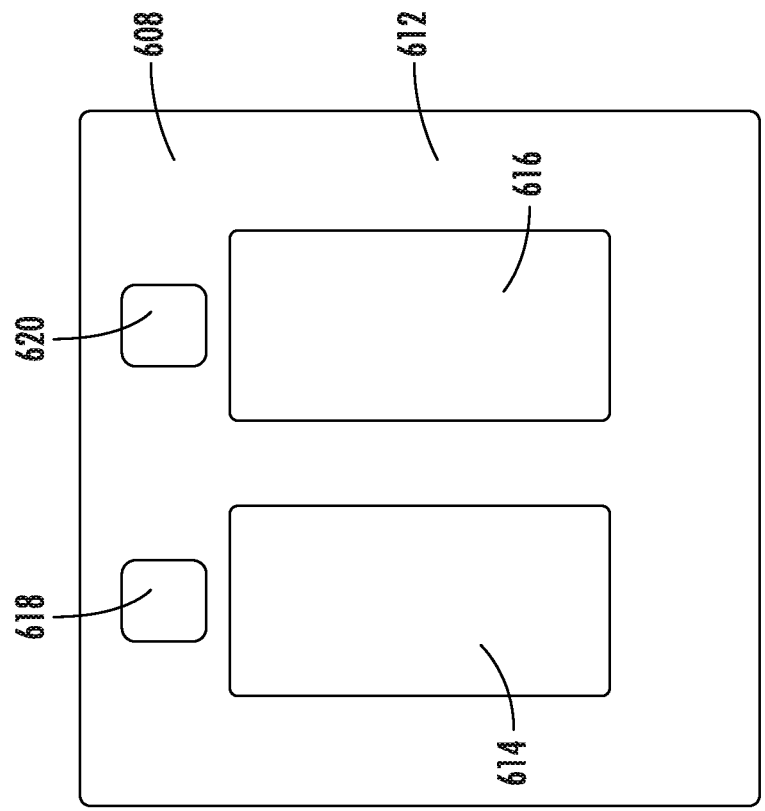
FIG. 6B illustrates a third embodiment of the smart wall-plate system depicted in FIG. 1.
Figure 6A:
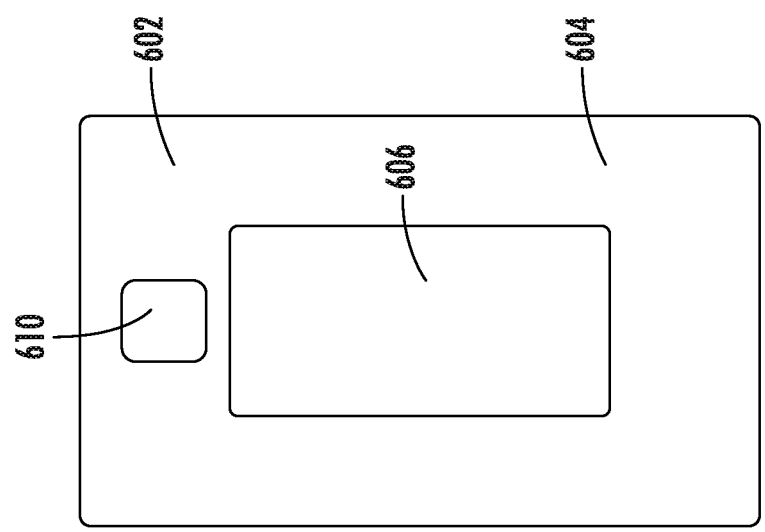
FIG. 6A illustrates a second embodiment of the smart wall-plate system depicted in FIG. 1.

FIGS. 6A and 6B illustrate embodiments of a smart wall-plate system 602 and 608. The smart wall-plate systems 602 and 608 may represent the smart wall-plate system 102 as depicted in FIGS. 1 and 2 and/or the smart wall-plate system 502 depicted in FIG. 5. FIGS. 6A and 6B illustrates physical components and features of the smart wall-plate systems 602 and 608, respectively. FIGS. 6A and 6B illustrate exemplary form factors of the smart wall-plate systems 602 and 608, respectively. The smart wall-plate systems 602 and 608 are not limited to the form factors shown in FIGS. 6A and 6B, respectively, as the arrangement of the constituent components of the smart wall-plate systems 602 and 608 may be varied in size, shape, and position as will be appreciated by a person of ordinary skill in the art.

As shown in FIG. 6A, the smart wall-plate system 602 may include a wall-plate cover 604 with an opening 606 and a user input component 610. The wall-plate cover 604 may fit over and/or attach to a mounting bracket of the smart wall-plate system 602 (not shown in FIG. 6A for simplicity) or directly to an in-wall device or an electrical junction box within which an in-wall device is mounted. The opening 606 may allow the wall plate 604 to fit over an in-wall device (e.g., any type of load control device like a switch or dimmer control including one or more switch or dimmer controls, any type of outlet or receptacle, and/or a combination thereof). The user interface component 610 may be a component of a user interface of the smart wall-plate system 602. The user interface component 610 may be any now known or hereafter developed user interface component such as, for example, a toggle switch, a push button, a capacitive touch switch, a paddle switch, proximity sensor, or the like. In some embodiments, the user interface component 610 comprises a pad, target, opening, or the like for a toggle switch, a push button, a capacitive touch switch, a paddle switch, proximity sensor, or the like. When a user engages the user interface component 610, an automated function, routine, or activity as described herein may be implemented by the wall-plate system 102 or by a combination of the wall-plate system 102 and a second device such as a, local device, a local controller, or a remote device such as a proprietary cloud 116 or a third-party cloud 118.

As shown in FIG. 6B, the smart wall-plate system 608 may include a wall-plate cover 612 with a first opening 614 and a second opening 616, a first user input component 618, and a second user input component 620. As will be appreciated by one of ordinary skill in the art, the smart wall-plate system 608 may include any now known or hereafter developed wall-plate cover 612 such as, for example, a paddle switch, a toggle style, etc. The wall-plate cover 612 may fit over and/or attach to a mounting bracket of the smart wall-plate system 608 (not shown in FIG. 6B for simplicity) or directly to an in-wall device or one or more electrical junction boxes. The first opening 614 may allow the wall-plate cover 608 to fit over a first in-wall device (e.g., a load control device or outlet such as a first switch) and the second opening 616 may allow the wall-plate cover 608 to fit over a second in-wall device (e.g., a second load control or outlet such as a second switch), such that the first and second switches may be two distinct switches or part of the same ganged or combined switch). Note also that each in-wall device 104 may include one or more switches, outlets, or other.

The first and second user interface components 618 and 620 may be components of a user interface of the smart wall-plate system 608. The first and second user interface components 618 and 620 may each be a push button. When a user engages the first user interface component 618, a first automated routine or activity as described herein may be implemented while when the user engages the second user interface component 620, a second automated routine or activity as described herein may be implemented by the wall-plate system 104 directly or via a second device such as a local controller, a local device, a cloud, and/or the like.

FIGS. 7A and 7B illustrate embodiments of a smart wall-plate system 702 and 710. The smart wall-plate systems 702 and 710 may represent the smart wall-plate system 102 as depicted in FIGS. 1 and 2 and/or the smart wall-plate system 502 depicted in FIG. 5. FIGS. 7A and 7B illustrates physical components and features of the smart wall-plate systems 702 and 710, respectively. FIGS. 7A and 7B illustrate exemplary form factors of the smart wall-plate systems 702 and 710, respectively. The smart wall-plate systems 702 and 710 are not limited to the form factors shown in FIGS. 7A and 7B, respectively, as the arrangement of the constituent components of the smart wall-plate systems 702 and 710 may be varied in size, shape, and position as will be appreciated by a person of ordinary skill in the art. The smart wall-plate systems 702 and 710 may be an alternative design of either of the wall-plate systems 602 and 608 and may include substantially the same components and capabilities—as such, a detailed discussion of the constituent components of the smart wall-plate systems 702 and 710 is not provided herein but is instead made in reference to similar components described in relation to FIGS. 6A and 6B.

As shown in FIG. 7A, the smart wall-plate system 702 may include a wall-plate cover 704, an opening 706, and a user input component 708. The wall-plate cover 704 may fit over and/or attach to a mounting bracket of the smart wall-plate system 702 (not shown in FIG. 7A for simplicity). The opening 706 may allow the wall-plate cover 704 to fit over an in-wall device (e.g., a load control device (e.g., a switch)) that is larger than the in-wall device that may fit through the opening 606 as shown in FIG. 6A. The user interface component 708 may be a component of a user interface of the smart wall-plate system 702. The user interface component 708 may be any now known or hereafter developed user interface component such as, for example, a toggle switch, a push button, a capacitive touch switch, a paddle switch, a proximity sensor, or the like. In some embodiments, the user interface component 708 comprises a pad, target, opening, or the like for a toggle switch, a push button, a capacitive touch switch, a paddle switch, a proximity sensor, or the like. When a user engages the user interface component 708, an automated routine or activity as described herein may be implemented. As will be appreciated by one of ordinary skill in the art, the smart wall-plate system 702 may include any now known or hereafter developed wall plate 704 such as, for example, a paddle switch, a toggle style, etc.

As shown in FIG. 7B, the smart wall-plate system 710 may include a wall-plate cover 712, a first opening 714, a second opening 716, a first user input component 718, and a second user input component 720. The wall-plate 712 may fit over and/or attach to a mounting bracket of the smart wall-plate system 710 (not shown in FIG. 7B for simplicity). The first opening 714 may allow the wall-plate 710 to fit over a first in-wall device such as a first switch or outlet and the second opening 716 may allow the wall-plate cover 710 to fit over a second in-wall device such as a second switch or outlet, such that the first and second switches or outlets are part of the same ganged in-wall device or a combined in-wall device, with the first and second in-wall devices having smaller, accessible actuators or device to access than those that may fit within the openings 614 and 616 of FIG. 6B. The first and second user interface components 718 and 720 may be components of a user interface of the smart wall-plate system 710. The first and second user interface components 718 and 720 may each be a push button or a target or pad for a capacitive switch or a capacitive proximity sensor. When a user engages the first user interface component 718, a first automated routine or activity as described herein may be implemented while when the user engages the second user interface component 720, a second automated routine or activity as described herein may be implemented.

Figure 8:
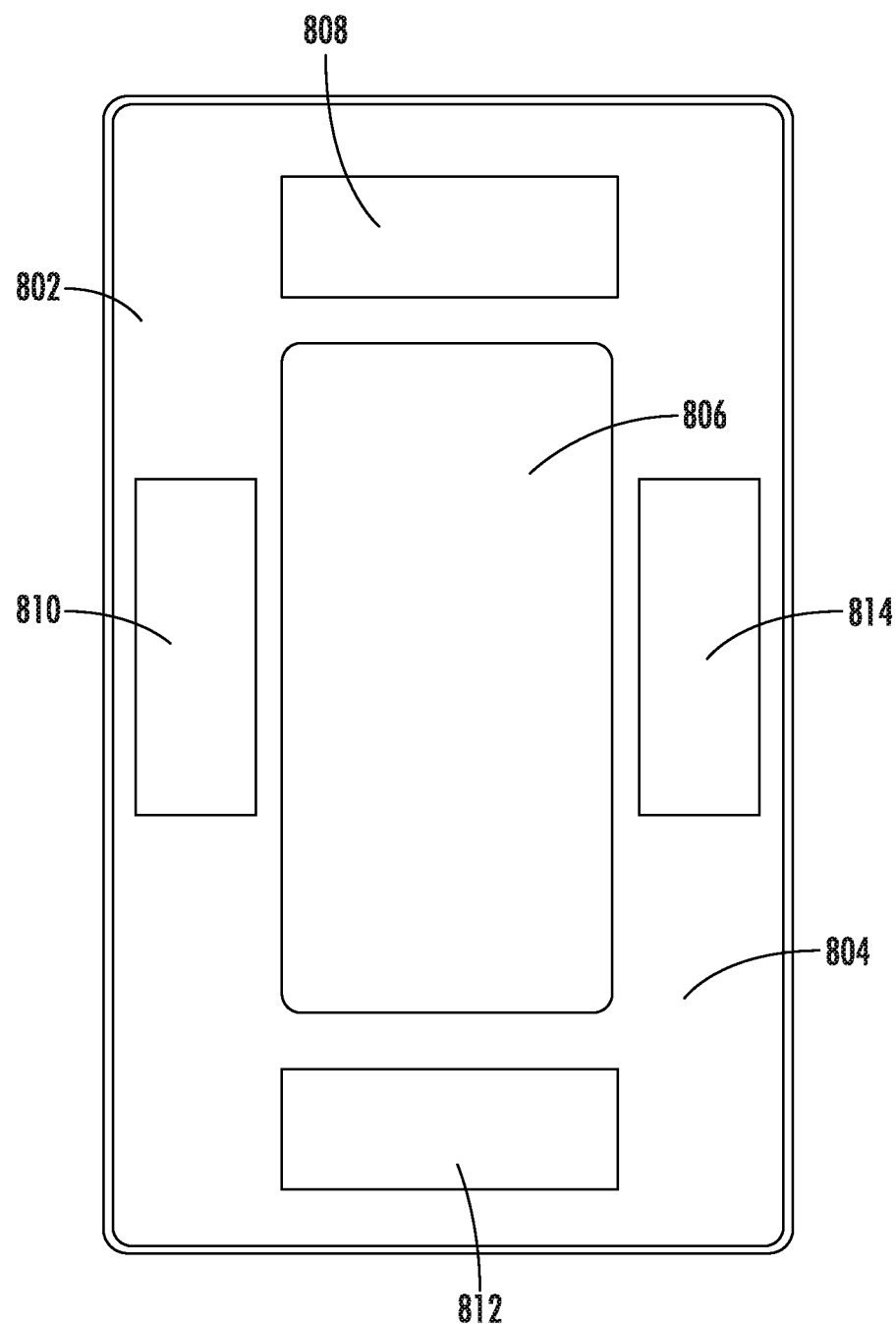
FIG. 8 illustrates a sixth embodiment of the smart wall-plate system depicted in FIG. 1.

FIG. 8 illustrates an embodiment of a smart wall-plate system 802. The smart wall-plate systems 802 may represent the smart wall-plate system 102 as depicted in FIGS. 1 and 2 and/or the smart wall-plate system 502 depicted in FIG. 5. FIG. 8 illustrates physical components and features of the smart wall-plate system 802. FIG. 8 illustrates an exemplary form factor of the smart wall-plate system 802. The smart wall-plate system 802 is not limited to the form factor shown in FIG. 8, as the arrangement of the constituent components of the smart wall-plate system 802 may be varied in size, shape, and position as will be appreciated by a person of ordinary skill in the art. The smart wall-plate system 802 may be an alternative design of either of the wall-plate systems 602, 608, 702, and 710 and may include substantially the same components and capabilities—as such, a detailed discussion of the constituent components of the smart wall-plate systems 802 is not provided herein but is instead made in reference to similar components described in relation to FIGS. 6A, 6B, 7A, and 7B.

As shown in FIG. 8, the smart wall-plate system 802 may include a wall plate 804 with an opening 806, a first user interface component 808, a second user interface component 810, a third user interface component 812, and a fourth user interface component 814. The wall-plate cover 804 may fit over and/or attach to a mounting bracket of the smart wall-plate system 802 (not shown in FIG. 8 for simplicity), an in-wall device 104, and/or an electrical junction box for an in-wall device 104. The opening 806 may allow the wall plate 804 to fit over an in-wall device (e.g., any type of load control device like a switch or dimmer control including one or more switch or dimmer controls, any type of outlet or receptacle, and/or a combination thereof). The first, second, third, and fourth user interface components 808, 810, 812, and 814 may be components of a user interface of the smart wall-plate system 802. The first, second, third, and fourth user interface components 808, 810, 812, and 814 may each be a target, a pad, or an opening for a capacitive touch switch, a push button, or other switch like a breaker. When a user engages the first user interface component 808, a first automated routine or activity as described herein may be implemented. When a user engages the second user interface component 810, a second automated routine or activity as described herein may be implemented. When a user engages the third user interface component 812, a third automated routine or activity as described herein may be implemented.

When a user engages the first user interface component 814, a fourth automated routine or activity as described herein may be implemented.

Figure 9:
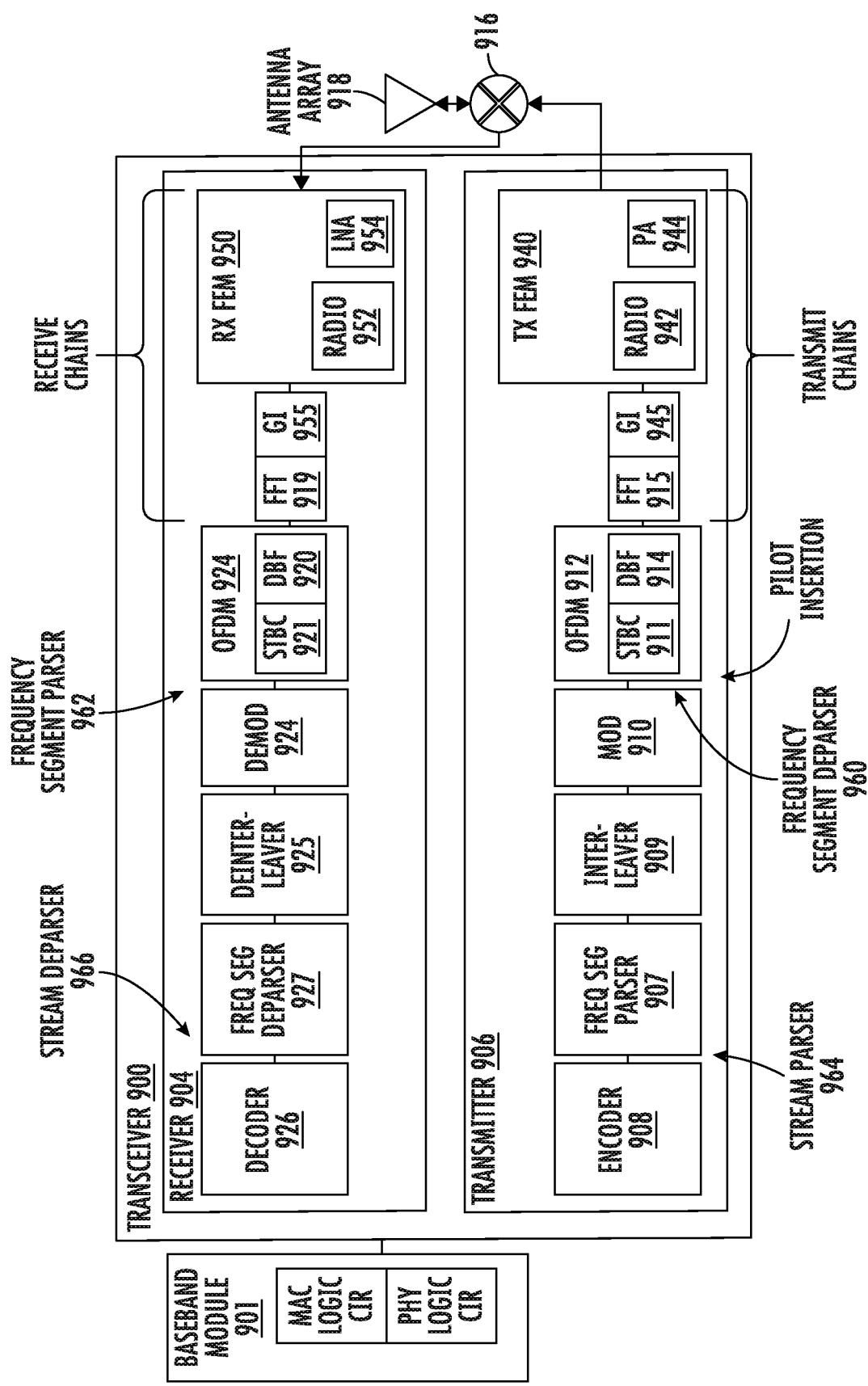
FIG. 9 illustrates an embodiment of a wireless transceiver, radio, and antenna array for the smart wall-plate system depicted in FIG. 1.

FIG. 9 depicts an embodiment of an apparatus such as the wireless communications interfaces 108 and 204 to generate, transmit, receive, and interpret or decode PHY protocol data units (PPDUs) and MAC protocol data units (MPDUs). The apparatus comprises a baseband module 901, a transceiver 900 coupled with the baseband module 901, and an antenna array 918 couple with the transmitter front end module (TX FEM) 940 and coupled with the receiver front end module (RX FEM) 950. The baseband module 901 may include processing circuitry to perform various wireless protocols in accordance with a standard and/or specification such as the IEEE 802.11 standards. In many embodiments, the baseband module 901 includes a baseband processor to execute code to perform MAC layer functionality. The MAC logic circuitry and PHY logic circuitry may represent circuitry to execute code in the baseband processor 901 and/or another processor; in other circuitry to implement logical operations of functionality of the MAC layer or the PHY; or a combination of both. The MAC logic circuitry may generate a MAC frame such as a management frame as a MSDU and the PHY logic circuitry may generate the physical layer protocol data unit (PPDU) by prepending the MAC frame or multiple MAC frames as MPDUs with a PHY preamble and a PHY header for transmission.

The transceiver 900 comprises a receiver 904 and a transmitter 906. Embodiments have many different combinations of modules to process data because the configurations are deployment specific. FIG. 3 illustrates some of the modules that are common to many embodiments.

Note that a wireless communications interface such as the wireless communications interface 108 in FIG. 1 may comprise multiple transmitters to facilitate concurrent transmissions on multiple contiguous and/or non-contiguous carrier frequencies.

The transmitter 906 may comprise one or more of an encoder 908, a stream deparser 966, a frequency segment parser 907, an interleaver 909, a modulator 910, a frequency segment deparser 960, an orthogonal frequency division multiplexing (OFDM) module 912, an Inverse Fast Fourier Transform (IFFT) module 915, a GI module 945, and a transmitter front end 940. The encoder 908 of transmitter 906 receives and encodes a data stream destined for transmission from the MAC logic circuitry with, e.g., a binary convolutional coding (BCC), a low-density parity check coding (LDPC), and/or the like. After coding, scrambling, puncturing and post-FEC (forward error correction) padding, a stream parser 964 may optionally divide the data bit streams at the output of the FEC encoder into groups of bits. The frequency segment parser 907 may receive data stream from encoder 908 or streams from the stream parser 964 and optionally parse each data stream into two or more frequency segments to build a contiguous or non-contiguous bandwidth based upon smaller bandwidth frequency segments. The interleaver 909 may interleave rows and columns of bits to prevent long sequences of adjacent noisy bits from entering a BCC decoder of a receiver.

The modulator 910 may receive the data stream from interleaver 909 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 910 may optionally be fed into the frequency segment deparser 960 to combine frequency segments in a single, contiguous frequency bandwidth. Other embodiments may continue to process the frequency segments as separate data streams for, e.g. a non-contiguous bandwidth transmission.

After the modulator 910, the data stream(s) are fed to an OFDM 912. The OFDM 912 may comprise a space-time block coding (STBC) module 911, and a digital beamforming (DBF) module 914. The STBC module 911 may receive constellation points from the modulator 910 corresponding to one or more spatial streams and may spread the spatial streams to a greater number of space-time streams. Further embodiments may omit the STBC.

The OFDM module 912 impresses or maps the modulated data formed as OFDM symbols onto a plurality of orthogonal subcarriers so the OFDM symbols are encoded with the subcarriers or tones. The OFDM symbols may be fed to the DBF module 914. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 915 may perform an inverse discrete Fourier transform (IDFT) on the OFDM symbols to map on the subcarriers. The guard interval (GI) module 945 may insert guard intervals by prepending to the symbol a circular extension of itself. The GI module 945 may also comprise windowing to optionally smooth the edges of each symbol to increase spectral decay.

The output of the GI module 945 may enter the transmitter front end module (TX FEM) 940. The transmitter front end 940 may comprise a radio 942 with a power amplifier (PA) 944 to amplify the signal and prepare the signal for transmission via the antenna array 918. In many embodiments, entrance into a spatial reuse mode by a communications device such as a station or AP may reduce the amplification by the PA 944 to reduce channel interference caused by transmissions.

The transceiver 900 may also comprise duplexers 916 connected to antenna array 918. The antenna array 918 radiates the information bearing signals into a time-varying, spatial distribution of electromagnetic energy that can be received by an antenna of a receiver. In several embodiments, the receiver 904 and the transmitter 906 may each comprise its own antenna(s) or antenna array(s).

The transceiver 900 may comprise a receiver 904 for receiving, demodulating, and decoding information bearing communication signals. The receiver 904 may comprise a receiver front-end module (RX FEM) 950 to detect the signal, detect the start of the packet, remove the carrier frequency, and amplify the subcarriers via a radio 952 with a low noise amplifier (LNA) 954.

The receiver 904 may comprise a GI module 955 and a fast Fourier transform (FFT) module 919. The GI module 955 may remove the guard intervals and the windowing and the FFT module 919 may transform the communication signals from the time domain to the frequency domain.

The receiver 904 may also comprise an OFDM 922, a frequency segment parser 962, a demodulator 924, a deinterleaver 925, a frequency segment deparser 927, a stream deparser 966, and a decoder 926. An equalizer may output the weighted data signals for the OFDM packet to the OFDM 922. The OFDM 922 extracts signal information as OFDM symbols from the plurality of subcarriers onto which information-bearing communication signals are modulated.

The OFDM 922 may comprise a DBF module 920, and an STBC module 921. The received signals are fed from the equalizer to the DBF module 920. The DBF module 920 may comprise algorithms to process the received signals as a directional transmission directed toward to the receiver 904. And the STBC module 921 may transform the data streams from the space-time streams to spatial streams.

The output of the STBC module 921 may enter a frequency segment parser 962 if the communication signal is received as a single, contiguous bandwidth signal to parse the signal into, e.g., two or more frequency segments for demodulation and deinterleaving.

The demodulator 924 demodulates the spatial streams. Demodulation is the process of extracting data from the spatial streams to produce demodulated spatial streams. The deinterleaver 925 may deinterleave the sequence of bits of information. The frequency segment deparser 927 may optionally deparse frequency segments as received if received as separate frequency segment signals or may deparse the frequency segments determined by the optional frequency segment parser 962. The decoder 926 decodes the data from the demodulator 924 and transmits the decoded information, the MPDU, to the MAC logic circuitry of the baseband module 901.

The MAC logic circuitry may parse the MPDU based upon a format defined in the communications device for a frame to determine the particular type of frame by determining the type value and the subtype value. The MAC logic circuitry may then interpret the remainder of MPDU.

While the description of FIG. 9 focuses on a single spatial stream system for simplicity, some embodiments are capable of multiple spatial stream transmissions and use parallel data processing paths for multiple spatial streams from the PHY logic circuitry through to transmission. Further embodiments may include the use of multiple encoders to afford implementation flexibility.

Figure 11:
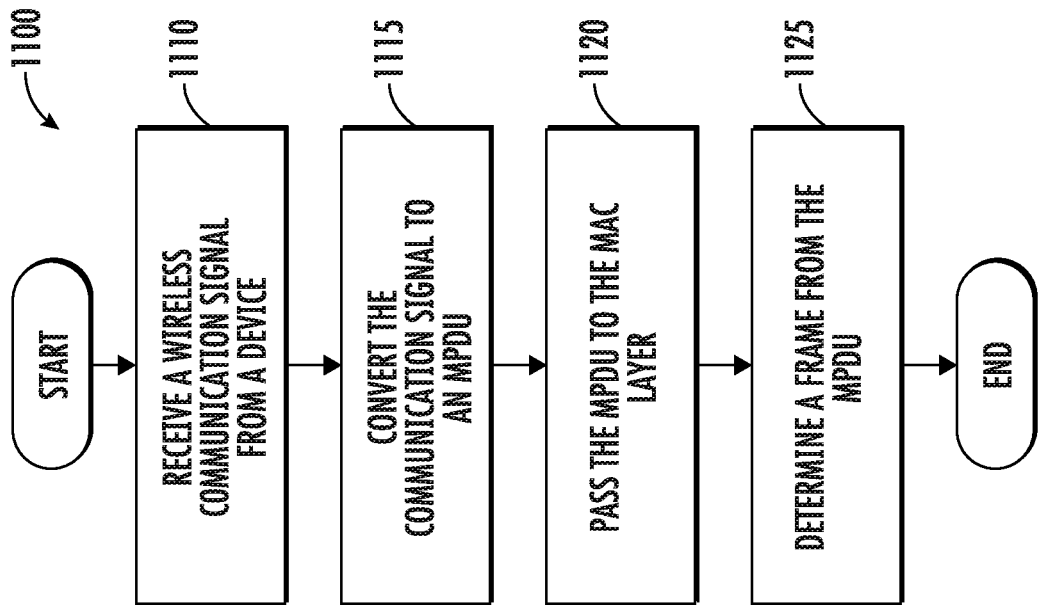
FIG. 11 depicts an embodiment of a flowchart to receive and interpret frames for communications between wireless communication devices for the smart wall-plate system depicted in FIG. 1.
Figure 10:
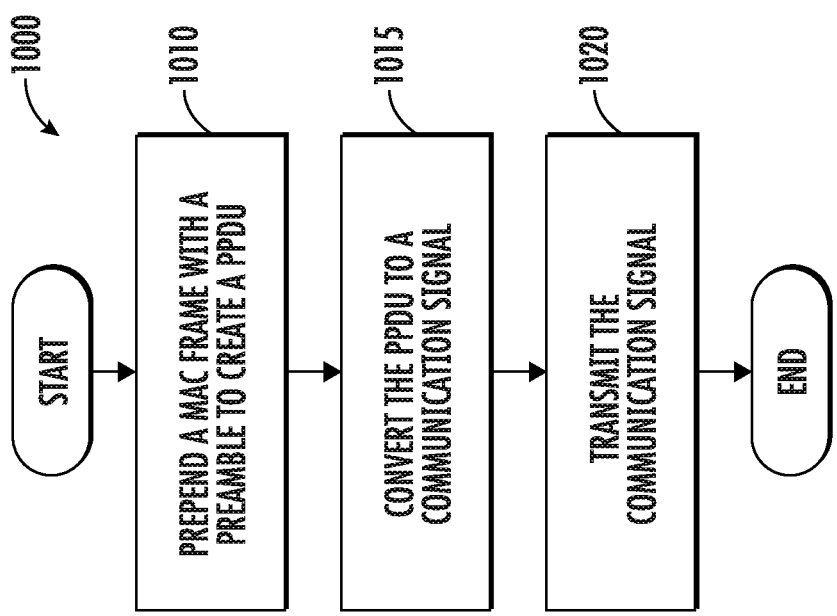
FIG. 10 depicts an embodiment of a flowchart to generate and transmit frames for communications between wireless communication devices for the smart wall-plate system depicted in FIG. 1.

FIGS. 10-11 depict embodiments of flowcharts 1000 and 1100 to transmit communications with a MAC frame. Referring to FIG. 10, the flowchart 1000 may begin with a wireless communications interface of a communications device such as the wall-plate system 102 in FIG. 1, generating an 802.11 preamble and PHY header for transmission on a channel (element 1010) such as a high-efficiency preamble or the legacy 802.11 preamble. The legacy 802.11 preambles may include, for instance, 802.11a preambles, 802.11n preambles, 802.11ac preambles, and/or other older standard preambles.

For example, a MAC layer logic circuitry of the wireless communications interface may generate a MAC frame in response to a user input via a user input component coupled with the wall-plate system 102 to transmit to one or more other devices of a network. The MAC frame may include a MAC header, a frame body, and a frame check sequence (FCS). The frame header may include, e.g., a basic service set identifier (BSSID) to identify an access point of a local area network or a PCP of a PBSS area network and a source address to identify the wall-plate system 102 as the source of the communications. In some embodiments, the frame header may include additional addresses to, e.g., relay the MAC frame through a relay station.

The frame body of the MAC frame may include an indication of the user input received by the wall-plate system 102. The indication may comprise an audio file, a code, and instruction, an identifier for the user input component through which the wall-plate system 102 received the user input, or a combination thereof. In one embodiment, for instance, the frame body may indicate multiple successive user inputs via the same or different user input components.

The MAC layer logic circuitry may pass the MAC frame as a MAC protocol data unit (MPDU) to a PHY logic circuitry of the wireless communications interface. The PHY logic circuitry may transform or convert the data into a packet of, e.g., orthogonal frequency division multiplexing (OFDM) symbols that can be transmitted to another device communicatively coupled with the area network after transmission of a PHY preamble and header.

The wireless communications interface may transmit a MPDU as a payload of a PHY frame, or PHY protocol data unit (PPDU) (element 1020). For example, a PHY device of the wireless communications interface may pass OFDM symbols to a radio to transmit the PPDU on one or more subcarriers of a carrier frequency via and antenna array.

Referring to FIG. 11, the flowchart 1100 begins with receipt of a wireless communication signal such as a setup signal from a device such as a local controller or a computing device 110. A receiver of wireless communications interface such as the receiver 904 in FIG. 9 may receive the wireless communication signal via one or more antenna(s) such as an antenna element of antenna array 918 (element 1110). The receiver may convert the communication signal into an MPDU in accordance with the process described in the preamble (element 1115). More specifically, the received signal is fed from the one or more antennas to a an OFDM module such as the OFDM module 922. The OFDM module extracts signal information from the plurality of subcarriers onto which information-bearing signals are modulated. Then, the demodulator such as the demodulator 924 demodulates the signal information via, e.g., BPSK, 16-QAM, 64-QAM, 256-QAM, QPSK, or SQPSK. And the decoder such as the decoder 926 decodes the signal information from the demodulator via, e.g., BCC or LDPC, to extract the MPDU (element 1115) and passes the MPDU to MAC sublayer logic such as MAC sublayer logic in the baseband module 901 (element 1120).

The MAC sublayer logic may parse the MPDU to determine MAC frame field values from the MPDU (element 1125) such as the MAC frame header 1060 fields like a protocol version field to verify compatibility, a frame type field and frame subtype field to determine the specific MAC frame format of the MPDU, the MAC frame body to obtain setup data such as authentication credentials (e.g., username and password) for the area network, and a frame check sequence (FCS) to verify the integrity of the MPDU as received.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. A wall-plate device, comprising:
   a wall plate to fit over an in-wall wiring device, the wall plate to cover a hole within a wall, the wall plate having:
   a front surface;
   a rear surface;
   a plurality of side surfaces;

an opening, wherein the in-wall wiring device is user-accessible via the opening when the wall-plate device is mounted over the in-wall wiring device, the in-wall wiring device to reside at least partially within the wall; and an interior volume, the interior volume defined by the front surface, the rear surface, the plurality of side surfaces, and the opening;

a printed circuit board (PCB) disposed within the interior volume and coupled to the wall plate, the PCB comprising circuitry including wireless communication circuitry, wherein the circuitry comprises:

a first circuit coupled with a mounting bracket;

a second circuit coupled with the wall plate; and a connector to couple the first circuit and the second circuit; and wherein the wireless communication circuitry comprises two or more wireless transmitters coupled with two or more radios to facilitate communication with one or more wireless devices and one or more cloud services platforms, the communication with the one or more wireless devices being via a first wireless communication protocol and the communication with the one or more cloud services platforms being via a second wireless communication protocol, the second wireless communication protocol being different from the first wireless communication protocol;

a user-accessible interface coupled to the wall plate, wherein the user-accessible interface is in electrical communication with the wireless communication circuitry, wherein the user-accessible interface is configured to receive a user input; and wherein upon receiving the user input, the wireless communication circuitry is configured to communicate with a remote device.

2. The wall-plate device of claim 1, wherein the mounting bracket is configured to couple the wall plate with an electrical junction box or the in-wall device, or a combination of the electrical junction box and the in-wall wiring device, wherein the wall plate is configured to snap onto the mounting bracket.

3. The wall-plate device of claim 1, wherein the first wireless communication protocol is a Bluetooth protocol and the second wireless communication protocol is a Wi-Fi protocol.

4. The wall-plate device of claim 1, wherein the circuitry comprises a memory component and a processor coupled with the memory component, the processor to execute code to process the input.

5. The wall-plate device of claim 1, wherein the circuitry comprises one or more sensors, wherein the input is a physical input, an audible input, a proximity input, or a combination thereof.

6. The wall-plate device of claim 1, wherein the user-accessible interface comprises at least one switch or at least one sensor, wherein the at least one switch comprises at least one of a capacitive touch switch, a capacitive proximity sensor, and a physical button.

7. The wall-plate device of claim 1, wherein the user-accessible interface comprises one or more light emitting diodes.

8. The wall-plate device of claim 1, wherein the user-accessible interface comprises a display, wherein the display comprises a touchscreen, at least a portion of the user interface is provided through the touchscreen.

9. The wall-plate device of claim 1, wherein the in-wall device is one of a switch, a receptacle, a lighting device, or a breaker; the switch to comprise at least one of a light switch, a double switch, and a dimmer switch; the receptacle to comprise at least one of a power receptacle, a phone line outlet, a data outlet, and an audio outlet.

10. The wall-plate device of claim 1, wherein the wall-plate device is configured to communicate with a remote application of the remote device.

11. The wall-plate device of claim 1, wherein the remote device is communicatively coupled with a first cloud services platform of the one or more cloud services platforms and the first cloud services platform is configured to execute an instruction associated with the user input.

12. The wall-plate device of claim 1, wherein the user-accessible interface is on the front surface of the wall plate.

13. The wall-plate device of claim 1, wherein the wireless communication circuitry, resides:

partially on the mounting bracket and partially on the wall plate;

only on the mounting bracket;

only on the wall plate;

resides in a cavity of an electrical junction box; or on a combination thereof.

14. The wall-plate device of claim 13, wherein the circuitry comprises a power source to provide power for at least part of the circuitry, wherein the power source comprises a battery, a connector configured to connect the circuitry with an external power source, or a combination thereof.

15. The wall-plate device of claim 13, wherein the circuitry comprises a connector configured to couple with wiring in the electrical junction box of the in-wall device to provide power for at least part of the circuitry, wherein the circuitry further comprises a power regulator.

16. The wall-plate device of claim 1, wherein the remote device is a local lighting device, smart device, Wi-Fi-enabled device, an Internet-of-Things (IoT) device, a smart appliance, a home service hub, or a combination thereof.

17. The wall-plate device of claim 16, wherein the local lighting device is a wireless-enabled local lighting device.

18. A method of using a wall-plate system having a user-accessible interface to direct operation of a remote device, the method comprising the steps of:

detecting a user input from the user-accessible interface coupled with a wall plate of the wall plate system, the wall plate to fit over an in-wall wiring device and to cover a hole within a wall, the in-wall wiring device to reside at least partially within the wall;

signaling the input through circuitry, the circuitry at least partially residing on a printed circuit board (PCB), wherein the PCB resides within an interior volume defined by a rear surface of the wall plate and side surfaces of the wall plate, a front surface of the wall plate to face away from an electrical junction box, wherein the signaling the input through the circuitry includes:

signaling through a first portion of the circuitry residing on the wall plate;

signaling through a second portion of the circuitry residing on a mounting bracket, wherein one or more of the signaling through the first or second portion of the circuitry includes signaling to wireless communication circuitry;

generating, via the wireless communication circuitry, a signal based on the step of detecting; and transmitting the signal to the remote device.

19. The method of claim 18, wherein the remote device is one of a lighting device, a non-lighting device comprising one of an Internet-of-things (IOT) device and a smart appliance, and a home service hub.

20. The method of claim 18, wherein the remote device is communicatively coupled with a cloud services platform.

21. The method of claim 18, wherein transmitting comprises wirelessly transmitting the signal directly to the remote device.

22. The method of claim 18, wherein detecting the user input further comprises receiving the user input as a physical input through at least one of a physical button, a capacitive switch, and a touchscreen.

23. The method of claim 18, wherein detecting the user input further comprises receiving the user input as an audible input.

24. The method of claim 18, wherein detecting the user input further comprises receiving the user input via the user-accessible interface on the front surface of the wall plate.

25. A method of using a wall-plate system comprising the steps of:
   receiving an input from a user-accessible interface coupled to a wall plate, the wall plate having:
      an opening, a front surface, a rear surface, a plurality of side surfaces, and an interior volume, the interior volume defined by the front surface, the rear surface, the plurality of side surfaces, and the opening;
   the wall plate being positioned proximate to an in-wall wiring device, the in-wall wiring device residing at least partially within a wall, the in-wall wiring device being user-accessible via the opening when the wall-plate system is mounted over the in-wall wiring device;
   in response to receiving the input, communicating a signal through circuitry at least partially located on a printed circuit board (PCB), which is disposed within the interior volume, wherein the step of communicating the signal through circuitry further comprises the steps of communicating the signal through:
      a first circuit residing on a mounting bracket;
      a second circuit residing on the wall plate;
      a connector in electrical communication with the first and second circuits; and
   a first wireless transmitter coupled to a first radio via a first wireless communication protocol of a wireless device; and
   a second wireless transmitter coupled to a second radio via a second wireless communication protocol of a cloud services platform, the second wireless communication protocol being different from the first wireless communication protocol.

* * * * *